United States Patent
Umeda et al.

(10) Patent No.: US 10,637,308 B2
(45) Date of Patent: Apr. 28, 2020

(54) ROTARY ELECTRICAL MACHINE INCLUDING AN ARMATURE CORE

(71) Applicant: MITSUBISHI ELECTRIC CORPORATION, Chiyoda-ku (JP)

(72) Inventors: Takashi Umeda, Chiyoda-ku (JP); Yasuki Kimura, Chiyoda-ku (JP); Akira Hashimoto, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 372 days.

(21) Appl. No.: 15/564,575

(22) PCT Filed: May 19, 2015

(86) PCT No.: PCT/JP2015/064323
§ 371 (c)(1),
(2) Date: Oct. 5, 2017

(87) PCT Pub. No.: WO2016/185560
PCT Pub. Date: Nov. 24, 2016

(65) Prior Publication Data
US 2018/0076674 A1    Mar. 15, 2018

(51) Int. Cl.
*H02K 1/18* (2006.01)
*H02K 1/16* (2006.01)
(Continued)

(52) U.S. Cl.
CPC ............... *H02K 1/185* (2013.01); *H02K 1/16* (2013.01); *H02K 1/278* (2013.01); *H02K 3/28* (2013.01);
(Continued)

(58) Field of Classification Search
CPC .......... H02K 1/185; H02K 1/16; H02K 1/278; H02K 3/28; H02K 15/024; H02K 2213/03
See application file for complete search history.

(56) References Cited

U.S. PATENT DOCUMENTS

| 4,139,790 | A | 2/1979 | Steen |
| 2012/0133225 | A1* | 5/2012 | Mizuike ................. H02K 1/146 310/71 |

(Continued)

FOREIGN PATENT DOCUMENTS

| JP | 9-219941 A | 8/1997 |
| JP | 2002-209345 A | 7/2002 |

(Continued)

OTHER PUBLICATIONS

International Search Report dated Aug. 4, 2015, in PCT/JP2015/064323 filed May 19, 2015.

*Primary Examiner* — Emily P Pham
(74) *Attorney, Agent, or Firm* — Xsensus LLP

(57) ABSTRACT

This invention, is concerning a rotary electrical machine, wherein, where Q is the number of a plurality of slots, P is the number of a plurality of magnets, gcd(Q, P) is the greatest common divisor of Q and P, m is the number of phases, and one position group is defined as a set of m positions spaced from each other along the circumferential direction of the armature core by a pitch of an angle of [360/{gcd(Q, p)×m}]°, an armature core is: formed by connection of a plurality of core pieces at connection positions that are set to positions included in one or more respective position groups from among gcd(Q, P) position groups formed at equal pitch along the circumferential direction of the armature core.

6 Claims, 27 Drawing Sheets

(51) Int. Cl.
   *H02K 1/27*        (2006.01)
   *H02K 3/28*        (2006.01)
   *H02K 15/02*          (2006.01)

(52) U.S. Cl.
   CPC ....... *H02K 15/024* (2013.01); *H02K 2213/03* (2013.01)

(56) References Cited

U.S. PATENT DOCUMENTS

| | | | | |
|---|---|---|---|---|
| 2015/0130322 A1* | 5/2015 | Hazeyama | ............. | H02K 1/146 310/215 |
| 2016/0329767 A1* | 11/2016 | Umeda | .................... | H02K 3/28 |
| 2018/0026502 A1* | 1/2018 | Kawasaki | ............. | B66B 11/043 310/179 |

FOREIGN PATENT DOCUMENTS

| | | |
|---|---|---|
| JP | 2004-274970 A | 9/2004 |
| JP | 2009-50098 A | 3/2009 |
| JP | 2009-254133 A | 10/2009 |
| JP | 2011-66991 A | 3/2011 |
| JP | 2012-228133 A | 11/2012 |
| JP | 2013-94059 A | 5/2013 |
| JP | 2013-219947 | 10/2013 |
| WO | WO 2015/033488 A1 | 3/2015 |
| WO | WO 2015/056364 A1 | 4/2015 |

\* cited by examiner

FIG. 13
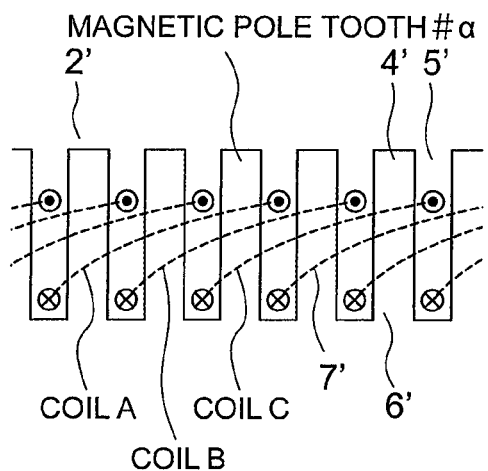
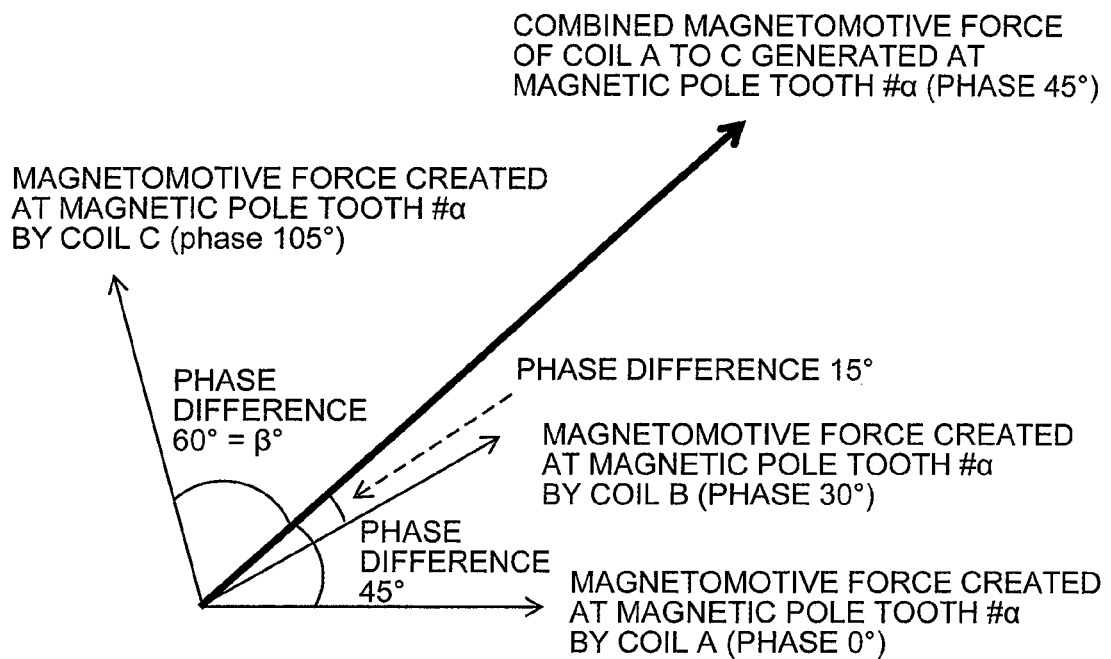

1G

ROTARY ELECTRICAL MACHINE INCLUDING AN ARMATURE CORE

TECHNICAL FIELD

The present invention relates to a rotary electrical machine that is provided with an armature and a rotary.

BACKGROUND ART

In conventional rotating electric machines, armature cores are formed using a laminated core, being a stack of thin plate-like steel sheets, in order to suppress generation of heat due to eddy current, logs in the armature. Armature cores are often formed using split cores, in order to enhance the production workability of the armature. In such cases, welding is resorted to as an ordinary method for connecting to each other the steel sheets of the laminated core, and to connect to each other the split cores (see for instance PTL 1 and 2).

Welding is a method that relies on a simple operation and that allows obtaining high connection strength easily and reliably. However, a problem of distortion in the armature core arises on account of the heat input into the armature core caused by welding.

The greater the overall uniformity of the facing distance (hereafter referred to as gap distance) between the magnetic pole teeth of the armature and the magnets of the rotor in the rotary electrical machine, the better are the operation characteristics obtained for instance in terms of suppression of operating vibration. In order to make the gap distance uniform, the armature and the rotor are required to exhibit a perfect circular shape, and hence it is necessary to avoid the occurrence of distortion in the armature core. In other words, distortion in the armature core caused by wielding is an underlying factor of impairment of the operation characteristics of the rotary electrical machine.

In the conventional technology disclosed in PTL 1, therefore, the positions of welding performed in order to connect to each other the steel sheets of the laminated core are distributed according to a staggered layout, to disperse heat input positions, and suppress as a result, distortion in the armature core.

In the conventional technology disclosed in PTL 2, the impact of distortion on the armature core is reduced by distributing, at regular intervals on the outer peripheral surface of the armature, a number of welding positions worked out on the basis of a relationship between the number of slots of the armature and the number of magnetic poles of the rotor.

CITATION LIST

Patent Literature

[PTL 1] Japanese Patent Application Publication No. H09-219941

[PTL 2] Japanese Patent Application. Publication No. 2013-219947

SUMMARY OF INVENTION

Technical Problem

However, these conventional technologies have the following problems.

In the conventional technology disclosed in PTL 1, welding of the laminated core requires connection of adjacent steel sheets to each other, for all the steel sheets that are stacked. Accordingly, the welding surface area is substantially identical to that of an instance where welding is performed in straight lines and not in a staggered fashion.

That is, the welding-derived heat input into the armature core is identical between staggered welding and straight-line welding. Therefore, distortion in the armature core often fails to be suppressed, even when welding is carried out in a staggered fashion.

In the conventional technology disclosed PTL 2 distortion, in the armature core occurs due to welding, and hence the perfect circular shape of the armature is lost to no small extent. Further, consideration is given only to the shape or the armature core during welding, while the impact of welding on the magnetic field generated in the armature remains unaddressed. Therefore, the operation characteristics of the rotary electrical machine may in some instances be significantly impaired depending on the relationship between the number of slots and the number of magnetic poles.

An object of the present invention, arrived at in order to solve the above problems, is to provide a rotary electrical machine that allows suppressing impairment of operation characteristics due to the occurrence of distortion in the armature core, as compared with conventional instances, also in a case where the armature core is formed by connection of a plurality of core pieces.

Solution to Problem

The rotary electrical machine of the present invention is a rotary electrical machine, including: an armature having an armature core that has an annular core back, a plurality of magnetic pole teeth arrayed in a circumferential direction and extending inward in a radial direction from an inner peripheral surface of the core back, and a plurality of slots respectively provided between adjacent magnetic pole teeth in the circumferential direction, the armature core being formed by connection of a plurality of core pieces, and a plurality of coils disposed in respective slots of the plurality of slots on the basis of a distributed winding or concentrated winding scheme; and a rotor having, on an outer peripheral surface thereof, a plurality of magnets arrayed in the circumferential direction, wherein, where Q is the number of the plurality of slots, P is the number of the plurality of magnets, $\gcd(Q, P)$ is the greatest common divisor of Q and P, m is the number of phases, and one position group is defined as a set of m positions spaced from each other along the circumferential direction of the armature core by a pitch of an angle $[360/\{\gcd(Q, P) \times m\}]°$, the plurality of core pieces are connected at connection positions which are set to positions respectively inducted in one or more of position groups, from among $\gcd(Q, P)$ position groups formed at equal pitch along the circumferential direction of the armature core.

Advantageous Effects of Invention

In the present invention, the positions at which a plurality of core pieces are connected to form an armature core are determined taking into consideration the magnetomotive forces generated by respective coils that are wound around respective magnetic pole teeth of the armature. As a result it becomes possible to obtain a rotary electrical machine that allows suppressing impairment of operation characteristics due to the occurrence of distortion in the armature core, as compared with conventional instances, also in a case where the armature core is formed by connection of a plurality of core pieces.

BRIEF DESCRIPTION OF DRAWINGS

FIG. 13 is a sat of explanatory diagrams for explaining a maximum electrical angle phase difference β° in Embodiment 4 of the present invention.

DESCRIPTION OF EMBODIMENTS

Preferred embodiments of the rotary electrical machine of the present invention will be explained next with reference to accompanying drawings. Identical or corresponding portions in the figures are denoted by identical reference symbols, and a recurrent explanation thereof will be omitted. In the embodiments, instances will be explained in which the invention of the present application is used in a three-phase AC rotary electrical machine, as an example of a rotary electrical machine.

Embodiment 1

Figure 1:
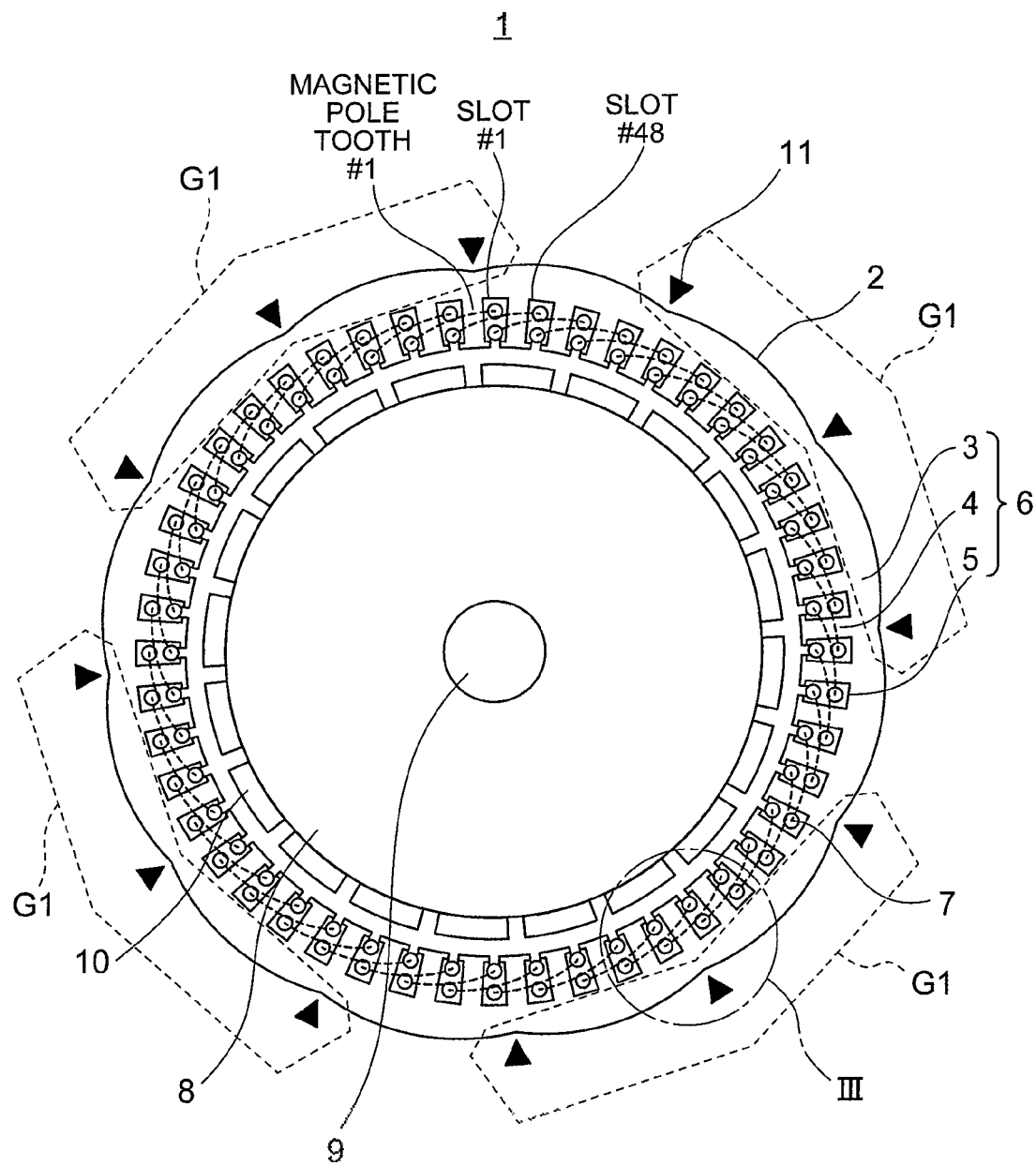
FIG. 1 is a plan-view diagram illustrating a rotary electrical machine of Embodiment 1 of the present invention.
Figure 2:
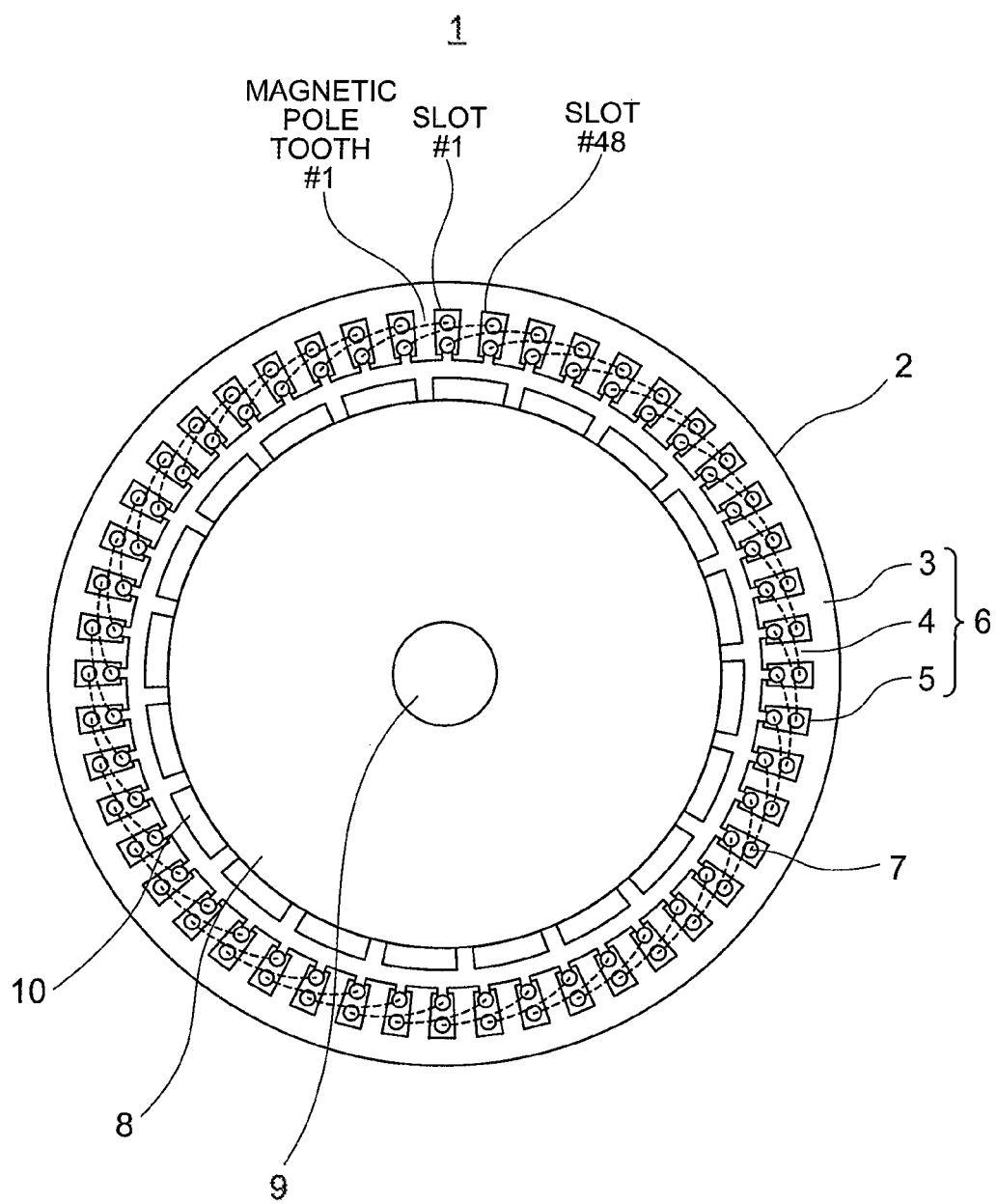
FIG. 2 is a plan-view diagram illustrating the rotary electrical machine of FIG. 1 without depicting connection positions or distortion of an armature core caused by welding.
Figure 3:
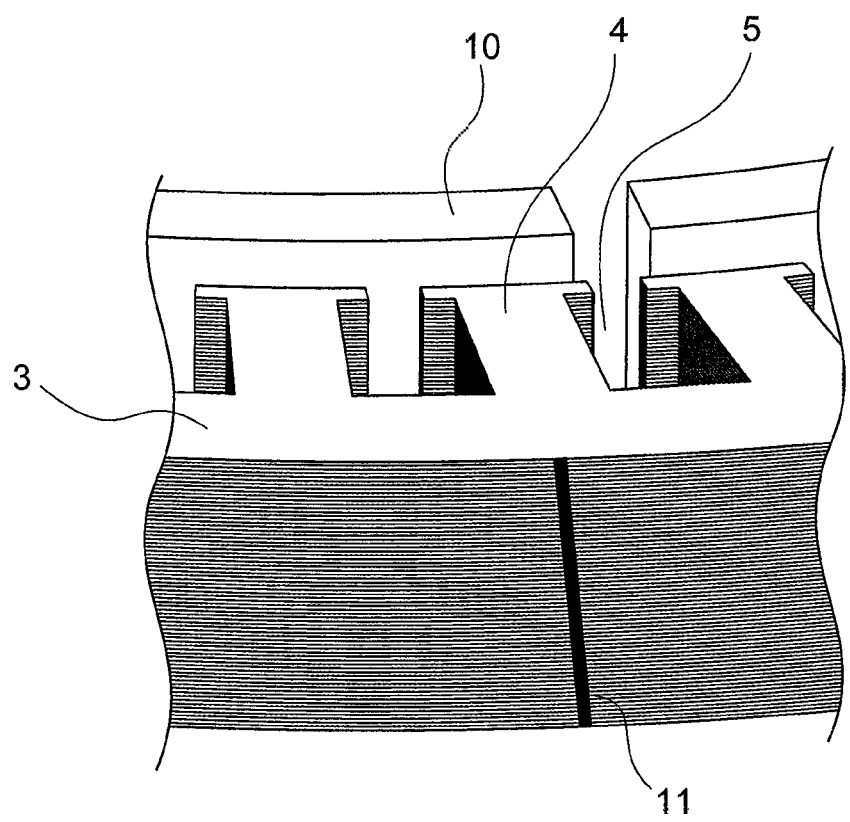
FIG. 3 is an enlarged perspective-view diagram illustrating portion III of FIG. 1.

FIG. 1 is a plan-view diagram illustrating a rotary electrical machine 1 of Embodiment 1 of the present invention. FIG. 2 is a plan-view diagram illustrating the rotary electrical machine 1 of FIG. 1 without depicting the connection positions 11 or distortion of an armature core 6 caused by welding. FIG. 3 is an enlarged perspective-view diagram illustrating portion III of FIG. 1.

In the present Embodiment 1 an instance is illustrated wherein the number of slots 5 of an armature 2 (hereafter referred to as number of slots Q) is 48 and the number of magnets 10 of a rotor 8 (hereafter referred to as number of magnetic poles P) is 20. In FIG. 1 and FIG. 2 dotted lines represent the coil end portions at which coil sides of coils 7 disposed in respective slots 5 are linked to each other. In FIG. 3 the coils 7 of FIG. 1 have been omitted.

The rotary electrical machine 1 is provided with the armature 2 and the rotor 8. The armature 2 has the armature core 6 having an annular core back 3, magnetic pole teeth 4 and slots 5; and the coils 7 disposed in the slots 5. The coils 7 in the present Embodiment 1 are configured as distributed windings and are assembled on the armature core 6 in a two-layer lap winding fashion.

Specifically, the conducting wires that make up the coils 7 are wound straddling a plurality of magnetic pole teeth 4, such that coils 7 of two respective phases are disposed in each slot 5. The bundles of the conducting wires that make tip the coils 7 are all of identical wire type and have an identical number of turns.

An insulator (not shown) is interposed between the armature core 6 and the coils 7. For instance insulating paper or a resin part may be used as the insulator.

The plurality of magnetic pole teeth 4 is arrayed in the circumferential direction, extending inward in the radial direction from the inner peripheral surface of the core back 3. The slots 5 are provided between adjacent magnetic pole teeth 4 in the circumferential direction. Ordinarily, the magnetic pole teeth 4 are provided on the inner peripheral surface of the core back 3, at substantially equal intervals from each other.

The armature core 6 is formed of a plurality of thin plate-like steel sheets corresponding to a plurality of core pieces. Specifically, the armature core 6 is a laminated core formed by stacking of a plurality of thin plate-like steel sheets. The plurality of steel sheets is stacked, and thereafter welding is performed at the connection positions 11 marked by the black triangle symbol (▼), in order to connect the steel sheets to each other. The steel sheets become connected to each other as a result, to form the armature core 6. Details on the connection, positions 11 at which welding is performed will be described further on.

The rotor 8, which is fixed to a rotating shaft 9, is configured to be rotatable with respect to the armature 2. A plurality of magnets 10 is arrayed, in the circumferential direction, on the outer peripheral surface of the rotor 8. The magnets 10 are ordinarily provided at substantially equal intervals on the outer peripheral surface of the rotor 8.

For convenience in the explanation that follows, a slot 5 serving as a reference (hereafter referred to as reference slot) will be notated as slot #1, with slots being sequentially notated as slots #2, #3, . . . , counterclockwise from slot #1, in cases where it is necessary to distinguish between slots 5. For the magnetic pole teeth 4, similarly a magnetic pole tooth 4 flanked by slot #1 and slot #2 will, foe notated as magnetic pole tooth #1, with teeth being sequentially notated as magnetic pole teeth #2, #3, . . . counterclockwise from magnetic pole tooth #1.

Figure 4:
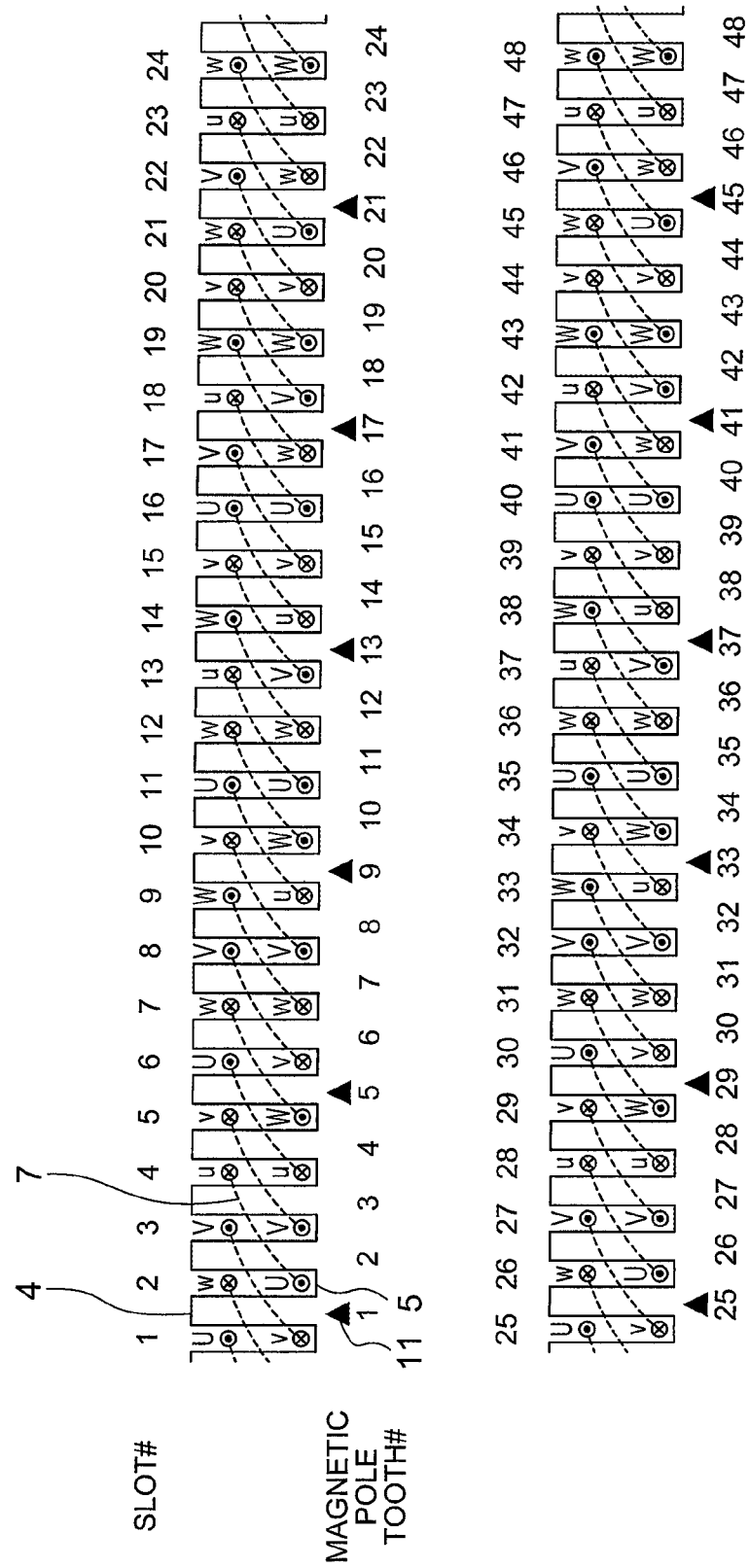
FIG. 4 is a linear developed-view diagram of the armature of FIG. 1.
Figure 5:
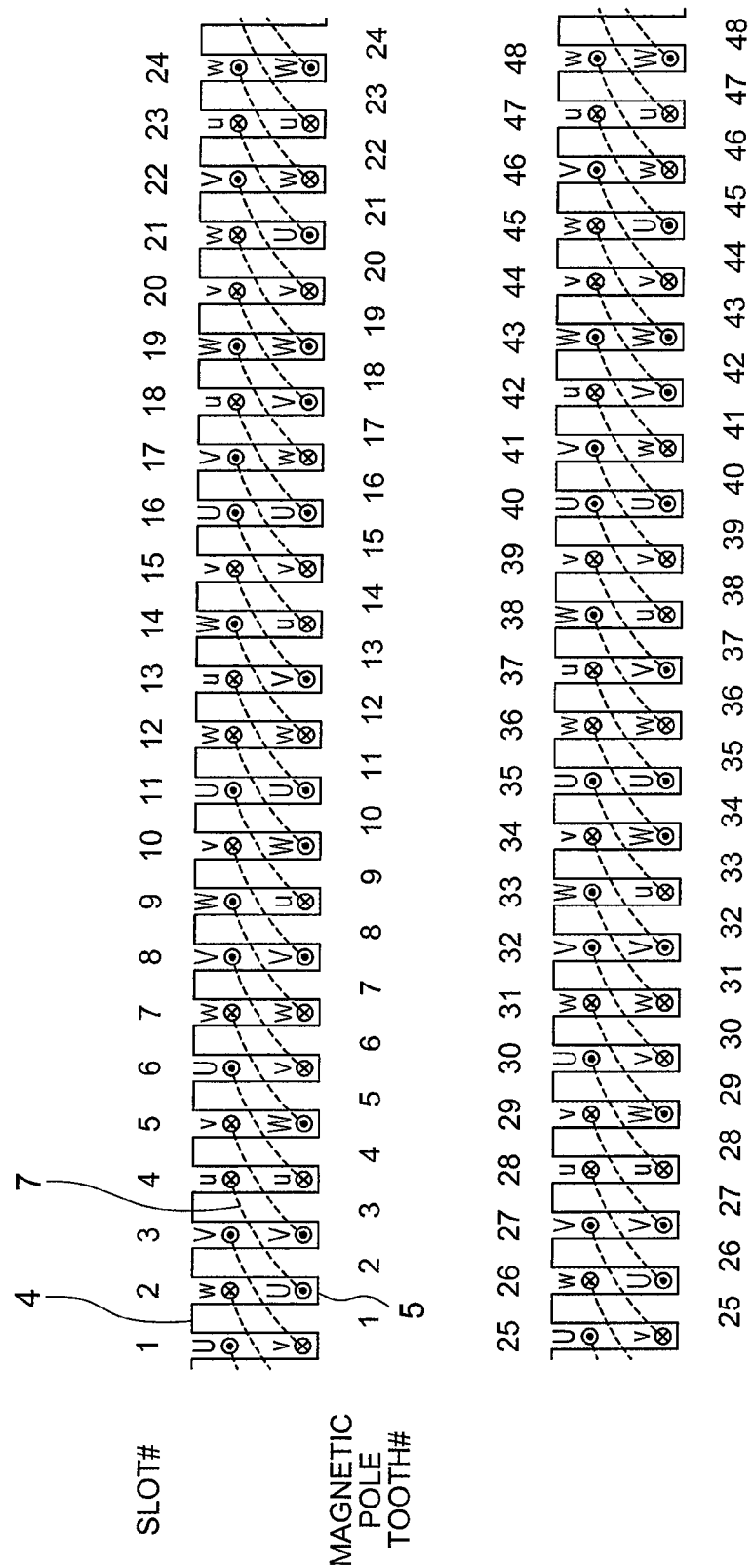
FIG. 5 is a linear developed-view diagram of the armature of FIG. 2.

Concrete arrangement examples of the coils 7 in the slots 5 will be explained next. FIG. 4 is a linear developed-view diagram of the armature 2 of FIG. 1. FIG. 5 is a linear developed-view diagram of the armature 2 of FIG. 2.

In FIG. 4 and FIG. 5, the armature 2 is virtually developed in a linear fashion for the purpose of explaining the coils 7 that are disposed in the slots 5 of the rotary electrical machine 1. The phases of current flowing in the coil sides of the coils 7 are notated as U, V and W. In order to distinguish the orientations of the current flowing in the coil sides of the coils 7, notations with uppercase letters U, V and W denote current of frontward orientation from the paper, while notations with lowercase letters u, v and w denote current of orientation in the depth direction of the paper. The coil end portions at which the coil sides are connected to each other are represented by dotted lines.

For instance, focus will be laid herein on a coil 7 disposed in slot #2 and slot #4 and Wound straddling magnetic pole tooth #2 and magnetic pole tooth #3. Herein, U-phase current flows in the coil 7 disposed in slot #2 and slot #4. Current flows frontward from the paper at the coil side of slot #2, while current flows depthwise into the paper at the coil side of slot #4.

In a case where the coils 7 are disposed in the slots 5 in a two-layer lap winding fashion, sinusoidal induced voltage can be generated by appropriate selection of the phase of the current corresponding to each coil 7 (i.e. U phase, V phase and W phase), the arrangement of the coils 7 in the slots 5 and the winding direction of the coils 7. It is ordinarily known that by adopting such a configuration a rotary electrical machine 1 is obtained that boasts good operation characteristics for instance in terms of good torque characteristic, low torque ripple, and little high-frequency vibration.

In an ideal state in order to achieve good operation characteristics in the rotary electrical machine 1, the composite vectors of the induced voltages generated in the respective coils 7 of the U phase, the V phase and the W phase are of identical magnitude, and are distributed at 120° of electrical angle phase difference. Therefore, the arrangement of the coils 7 in the slots 5 and the winding direction of the coils 7 is selected so as to achieve the above ideal state, or a state close to the above ideal stats. The same is found to be true of an instance where the coils 7 are disposed in the slots 5 in a two-layer lap winding fashion as well as in some other manner, such as concentric winding.

Figure 6:
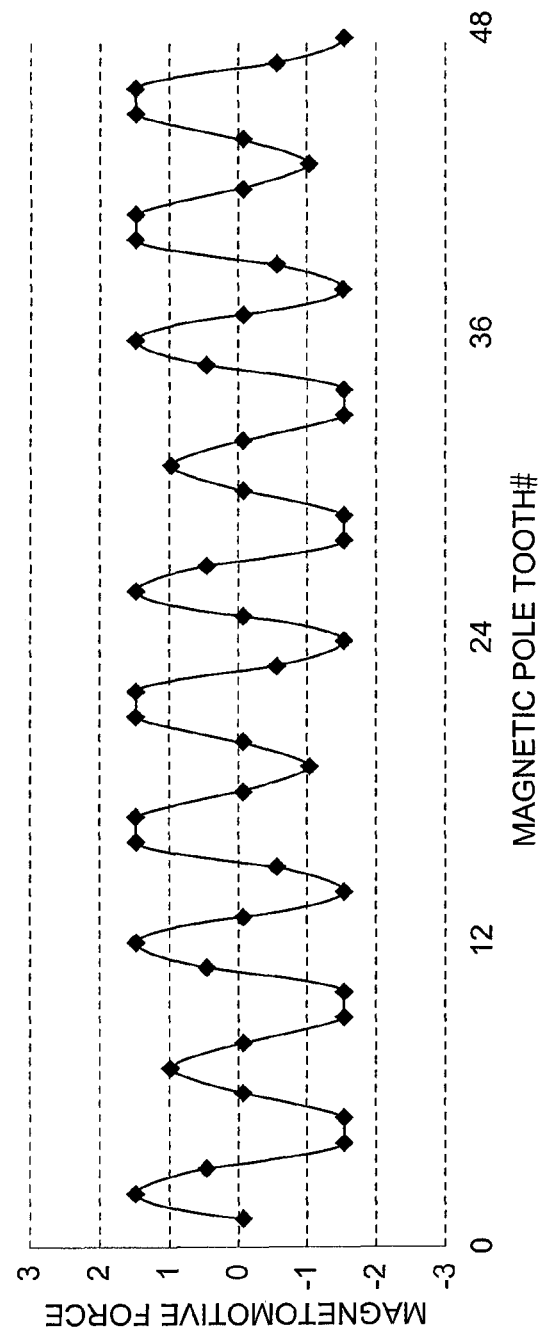
FIG. 6 is an explanatory diagram illustrating the state of magnetomotive force at a given point in time where the magnetomotive force is generated by coils wound around magnetic pole teeth in Embodiment 1 of the present invention.

Details of the connection positions 11 at which welding is performed in order to connect the plurality of steel sheets to each other will be explained next. FIG. 6 is an explanatory diagram illustrating the state of magnetomotive force at a given point in time where the magnetomotive force is generated by the coils 7 wound around the magnetic pole teeth 4 in Embodiment 1 of the present invention. To make the explanation easier to comprehend, the diagram illustrates theoretical values of magnetomotive force generated by the magnetic pole teeth 4, as a result of a calculation assuming the number of turns of the coils 7 in FIG. 6 to be one turn, and the magnitude of the current flowing in the coils 7 to be 1 A.

In a case where number of slots Q=48 and number of magnetic poles P=20, the number of slots q per pole per phase is given by Expression (1) below. The number of slots q per pole per phase is used ordinarily as a coefficient that represents the relationship between the number of slots Q and the number of magnetic poles P, taking m as the number of phases of the rotary electrical machine. Herein there holds m=3, since the rotary electrical machine 1 is a three-phase AC rotary electrical machine. Further, P/gcd(Q, P) is not set to a multiple of 3, with gcd(Q, P) being the greatest common divisor of the number of slots Q and the number of magnetic poles P.

[Math. 1]

$$q = \frac{Q}{P \times m} = \frac{4}{5} \qquad (1)$$

In the rotary electrical machine 1, the electrical angle difference between adjacent magnetic pole teeth 4 is 75°, as given by Expression (2) below, since Q=48 and P–20.

[Math. 2]

$$\frac{P}{Q} \times 180° = 75° \qquad (2)$$

Any of the magnetic pole teeth 4 may be selected herein from among magnetic pole teeth #1 to #43. The magnetic pole tooth 4 thus selected as a reference is called a reference magnetic pole tooth. In the embodiments, instances will be illustrated where magnetic pole tooth #1 is selected as the reference.

In this case, the electrical angle of the magnetic pole teeth 4 present at a positions spaced by [Q/{gcd(Q, P)×m}] positions from magnetic pole tooth #1 is given by Expression (3) below, assuming 0° as the electrical angle of magnetic pole tooth #1 being the reference magnetic pole tooth.

[Math. 3]

$$\frac{P}{gcd(Q, P) \times m} \times 180° = \frac{P}{gcd(Q, P)} \times 60° \quad (3)$$

As described above, P/gcd(Q, P) is not a multiple of 3, and accordingly the electrical angle that three magnetic pole teeth #[x+Q/{gcd(Q, P)×m}×b] can take conforms to any of Case 1 to Case 4 below.

In Cases 1 to 4, 'a' is an integer equal to or greater than 0. Further, x is the number of a magnetic pole tooth 4 that constitutes a reference magnetic pole tooth. Herein there holds x=1, since magnetic pole, tooth is taken as the reference magnetic pole tooth. Further, b is b=0, 1, 2. That is, the three magnetic pole teeth #[x+Q/{gcd(Q, P)×m}×b] denote magnetic pole tooth #x, magnetic pole tooth #[x+Q/{gcd(Q, P)×m}] and magnetic pole tooth #[x+2Q/{gcd(Q, P)×m}].

Case 1

Case Where P/gcd(Q, P)=6a+1

In this case, the electrical angles of the three magnetic pole teeth #[x+Q/{gcd(Q, P)×m}×b] are 0°, 60° (240°) and 120°, respectively. Numerical values in brackets (i.e. 240°) represent electrical angles for coils 7 disposed in reverse winding.

Case 2

Case Where P/gcd(Q, P)=6a+2

In this case, the electrical angles of the three magnetic pole teeth #[x+Q/{gcd(Q, P)×m}×b] are 0°, 120°, 240°, respectively.

Case 3

Case Where P/gcd(Q, P)=6a+4

In this case, the electrical angles of the three magnetic pole teeth #[x+Q/{gcd(Q, P)×m}×b] are 0°, 240° and 120°.

Case 4

Case Where P/gcd(Q, P)=6a+5

In this case, the electrical angles of the three magnetic pole teeth # [x+Q/{gcd(Q, P)×m}×b] are 0°, 300° (120°) and 240°. Numerical values in brackets (i.e. 120°) represent electrical angles for coils 7 disposed in reverse winding, It is found that in all Cases 1 to 4 the electrical angles of the three magnetic pole teeth #[x+Q/{gcd(Q, P)×m}×b] are combinations of 0°, 120° and 240°.

In a case where, for instance, a magnetic pole tooth 4 corresponding to the U phase, is set as magnetic pole tooth #1 being the reference magnetic pole tooth, then magnetic pole tooth #[1+Q/{gcd(Q, P)×m}] is a magnetic, pole tooth 4 corresponding to the V phase, and magnetic pole tooth #[1+2Q/{gcd(Q, P)×m}] is a magnetic pole tooth 4 corresponding to the W phase.

As a concrete example, in the present Embodiment 1 there holds Expression (4) since Q=48 and P=20.

[Math. 4]

$$\frac{Q}{gcd(Q, P) \times m} = \frac{48}{4 \times 3} = 4 \quad (4)$$

As FIG. 6 reveals, magnetomotive force is generated at phases with a 120° shift in electrical angle, in three magnetic pole teeth #1, #5 and #9, respectively. Magnetomotive force is generated at phases with a 120° shift in electrical angle in three respective magnetic pole teeth 4 spaced from each other by a pitch of four magnetic pole teeth, in the circumferential direction of the armature core 6, for instance pole teeth #2, #6 and #10 and so forth.

Herein, the magnetomotive forces of the phases in the rotary electrical machine 1 are generated with good balance, and accordingly the operation characteristics of the rotary electrical machine 1 are good. In a case for instance of three phases, the magnetomotive forces of the three U phase, V phase and W phase are generated with good balance, and accordingly the operation characteristics of the rotary electrical machine 1 are good.

Inward distortion in the radial direction may ordinarily occur in the armature core 6, due to welding heat, in a case where the armature core 6 is formed by connecting a plurality of steel sheets to each other through welding at the outer peripheral surface of the armature core 6. As a result, the gap distance between the magnetic pole teeth 4 and the magnets 10 may shrink, giving rise to changes in the operation characteristics of the rotary electrical machine 1.

In the present Embodiment 1, therefore, one position group G1 is defined as a set of m positions spaced from each other by a pitch of [Q/{gcd(Q, P)×m}] along the circumferential direction of the armature core 6. In other words, one position group G1 is defined as the set of m positions spaced from each other by a pitch of angle [360/{gcd(Q, P)×m}]° along the circumferential direction of the armature core 6.

Further, in positions included in the position group G1 are present on the outer peripheral surface or the inner peripheral surface of the armature core 6. Positions included in one or more position groups from among the plurality of gcd(Q, P) position groups G1 formed at equal pitch along the circumferential direction of the armature core 6 are set as the connection positions 11.

For instance, one position group G1 constitutes a set of the positions of m magnetic pole teeth 4 in a case where the positions of magnetic pole teeth 4 are taken as the connection positions 11. The connection positions 31 are set to the positions of respective the magnetic pole teeth 4 included in gcd(Q, P) position groups G1 formed at equal pitch along the circumferential direction of the armature core 6. Welding is performed at these connection positions 11.

The impact exerted by welding distortion of the armature core 6 on the magnetomotive force of each phase is rendered thus uniform by setting the positions of the magnetic pole teeth 4 included in the position group G1 as the connection positions 11. As a result it becomes possible to secure good characteristics of the rotary electrical machine 1 even upon welding of the armature core 6.

In the rotary electrical machine 1 illustrated in FIG. 1, specifically, there are formed four divided position groups G1, each being a respective set of positions of three magnetic pole teeth 4, spaced from each other at four pitches. In other words, the position groups G1, each being respective positions of three magnetic pole teeth 4 spaced from each other at pitch of a 30° angle, are formed divided into four groups. The position groups G1 appear thus as four groups at equal pitch along the circumferential direction of the armature core 6.

The positions of the respective magnetic pole teeth 4 included in the four position groups G1 are set as the connection positions 11. Specifically, the positions of magnetic pole teeth #1, #5 and #9 included in a first position group G1, the positions of magnetic pole teeth #13, #17 and #21 included in a second position group G1, the positions of magnetic pole teeth #25, #29 and #33 included in a third position group G1, and the positions of magnetic pole teeth #37, #41 and #45 included in a fourth position group G1 are set as the connection positions 11.

By performing, thus welding taking the positions of the position groups G1, as the connection positions 11, it becomes possible to reduce the impact on the operation characteristics of the rotary electrical machine as compared with performing welding at positions for which just mechanical strength is taken into consideration, as in conventional art. Specifically, through welding at the positions of the position groups G1, the armature core 6 becomes formed by connection, of the plurality of steel sheets to each other, and it becomes possible to further suppress impairment of the operation characteristics of the rotary electrical machine 1, derived from the occurrence of distortion in the armature core 6, as compared with conventional instances, while increasing the stiffness of the armature core 6.

Figure 7:
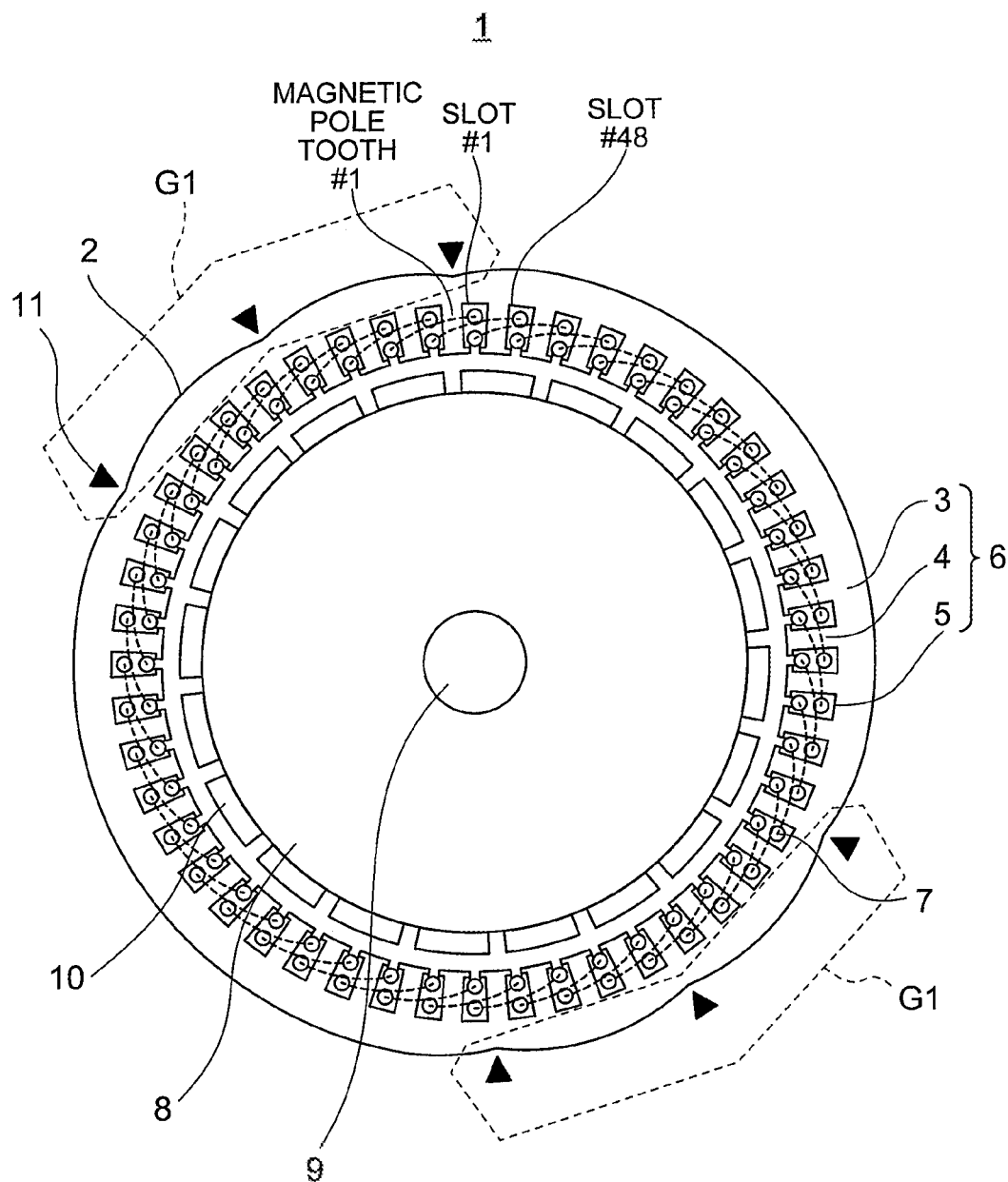
FIG. 7 is a plan-view diagram illustrating another example of the rotary electrical machine of Embodiment 1 of the present invention.

Another example of the rotary electrical machine 1 of the present Embodiment 1 will be explained next with reference to FIG. 7. FIG. 7 is a plan-view diagram illustrating another example of the rotary electrical machine 1 of Embodiment 1 of the present invention.

In the present Embodiment 1 an instance has been explained in which welding is performed at the positions of all the position groups G1 from among the gcd(Q, P) position groups G1, as illustrated in FIG. 1. However, welding need not be performed at the positions of all the position groups G1 from among the gcd(Q, P) position groups G1; herein, the positions of one or more position groups G1 may be set as the connection positions 11, as illustrated in FIG. 7. In this case as well, the magnetomotive force of each phase in the rotary electrical machine 1 is generated with good balance, and hence the operation characteristics of the rotary electrical machine 1 are good. FIG. 7 illustrates an example where the positions of two position groups G1 are set as the connection positions 11.

In the present Embodiment 1, thus, in a case where coils are configured by being assembled on the armature core on the basis of a distributed winding scheme, positions included in one or more respective position groups from among gcd(Q, P) position groups are set as connection positions, and the armature core is formed by connection of a plurality of core pieces (specifically, thin plate-like steel sheets) at those connection positions.

As a result it becomes possible to obtain a rotary electrical machine that allows suppressing impairment of operation characteristics due to the occurrence of distortion in the armature core, as compared with conventional instances, also in a case where the armature core is formed by connection of a plurality of core pieces.

Embodiment 2

Figure 8:
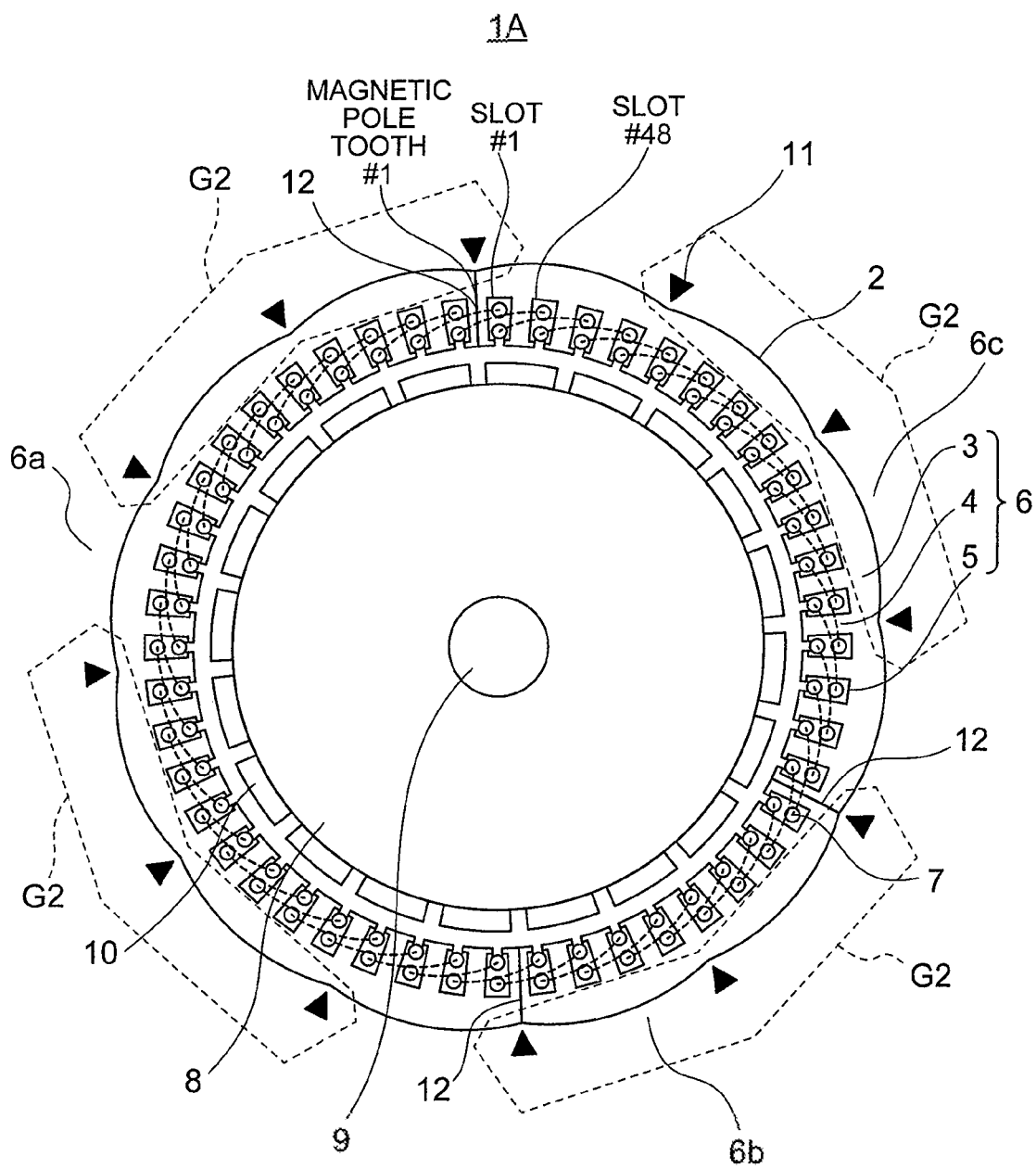
FIG. 8 is a plan-view diagram illustrating a rotary electrical machine of Embodiment 2 of the present invention.

In Embodiment 2 of the present invention, unlike in Embodiment 1 above, a plurality of split cores 6a to 6c, each formed through stacking of a plurality of steel sheets, are connected to each other, to form one annular armature core 6. FIG. 8 is a plan-view diagram illustrating a rotary electrical machine 1A of Embodiment 2 of the present invention.

The rotary electrical machine 1A is similar to the rotary electrical machine 1 of Embodiment 1, except that now the armature core 6 is configured out of three split cores 6a to 6c. Therefore, the arrangement of the coils 7 in the slots 5 in FIG. 8 is similar to that of Embodiment 1 above. Although in FIG. 8 the connection positions 11 denoted by the black triangle symbol (▼) are provided at equal pitch on the outer peripheral side of the armature core 6 made up of the three split cores 6a to 6c, the connection positions 11 as well are similar to those of Embodiment 1. Also position groups G2 illustrated in FIG. 8 are conceptually similar to the position groups G1 explained in Embodiment 1.

In the present Embodiment 2, the three split cores 6a to 6c are connected to each other at the connection positions 11. Specifically, the positions of the split faces 12 of the split cores 6a to 6c are caused to match the connection positions 11. Through welding at such connection positions 11, the three split cores 6a to 6c become connected to each other, and there is formed the armature core 6 being one circular connected body.

In FIG. 8 there is illustrated an instance where the positions of the split faces 12 are matched to the position of magnetic pole tooth #1 included in a first position group G2 and the positions of magnetic pole teeth #25 and #33 included in a third position group G3.

In the present Embodiment 2, the positions included in one or more, respective position groups from among the gcd(Q, P) position groups are set as connection positions, and several of the connection positions may be matched to the positions of split faces; the armature core is thereupon formed by connection of a plurality of core pieces (specifically, split cores) at the connection positions.

An effect is obtained, as a result that is similar to that of Embodiment 1 above, and, in addition, an armature is configured out of split cores that can be produced to a smaller than size than that of a circular armature core. It becomes therefore possible to enhance the production, workability of the rotary electrical machine.

Embodiment 3

Figure 9:
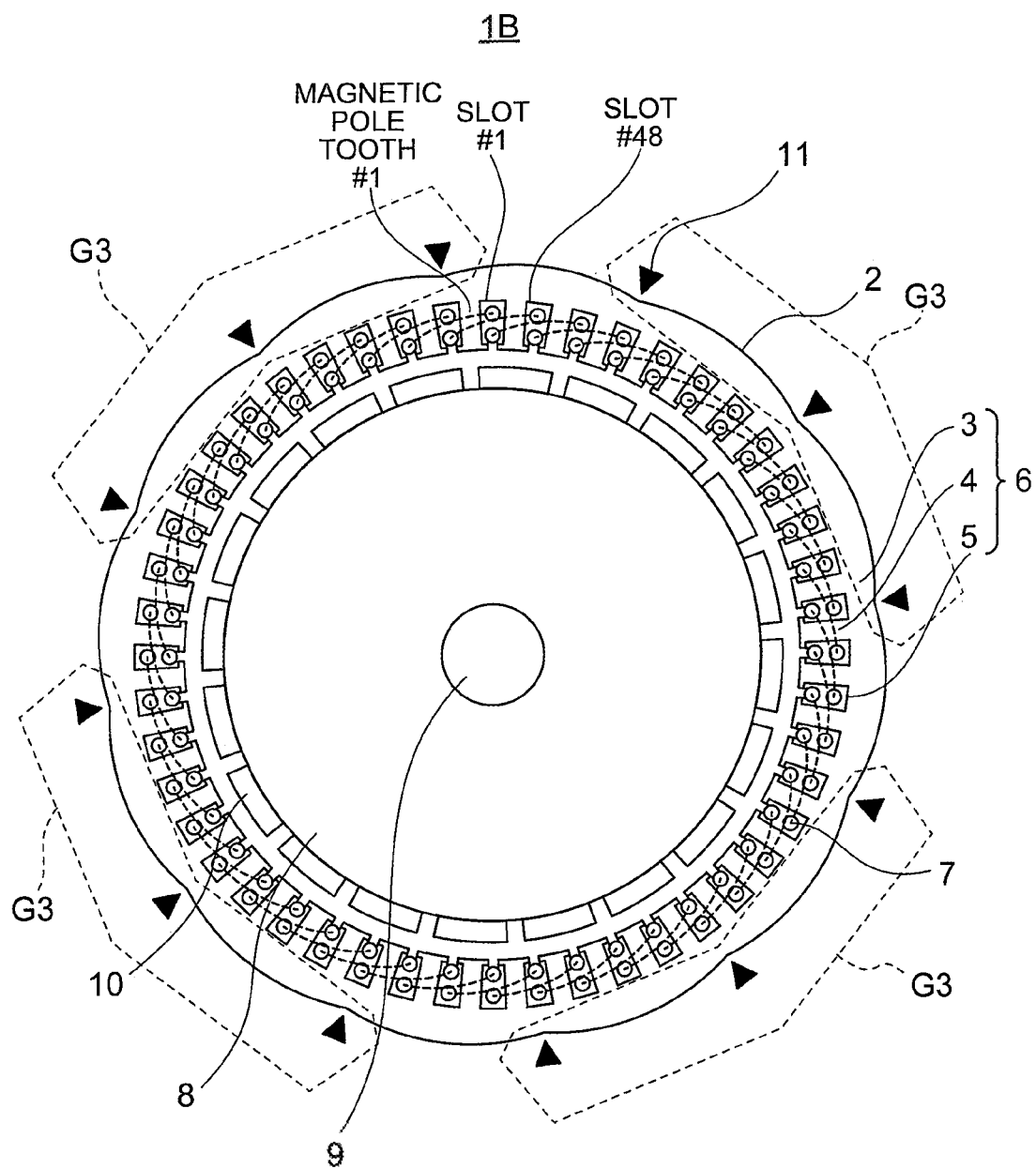
FIG. 9 is a plan-view diagram illustrating a rotary electrical machine of the present Embodiment 3.

In Embodiment 3 of the present invention, unlike Embodiments 1 and 2 above, the positions of the slots 5, and not the positions of the magnetic pole teeth 4, are set as the connection positions 11. FIG. 9 is a plan-view diagram illustrating a rotary electrical machine 1B of the present Embodiment 3.

The rotary electrical machine 1B is similar to the rotary electrical machine 1 of Embodiment 1 above, except that now it is the positions of the slots 5, not the positions of the magnetic pole teeth 4, that are set as the connection positions 11. Therefore, the arrangement of the coils 7 in the slots 5 in FIG. 9 is identical to that of Embodiment 1 above.

In the present Embodiment 3, one position group G3 constitutes a set of positions of m slots 5. The positions of respective slots 5 included in gcd(Q, P) position groups G3 formed at equal pitch along the circumferential direction of the armature core 6 are set as the connection positions 11.

In the rotary electrical machine 1B illustrated, in FIG. 9, specifically, there are formed four divided position groups G3, each being a set of the respective positions of three slots 5 spaced from each other at four pitches. In other words, the position groups G3 appear thus as four groups sit equal pitch along the circumferential direction of the armature core 6, similarly to Embodiment 1.

The positions of respective slots 5 included in the four position groups G3 are set as the connection positions 11, taking slot #2 as a reference. Specifically, the positions of slots #2, #6 and #10 included in a first position group G3, the positions of slots #14, #18 and #22 included in a second position group G3, the positions of slots #26, #30 and #34 included in a third position group G3, and the positions of slots #38, #42 and #46 included in a fourth position group G3, are set as the connection positions 11.

The magnetomotive force of each phase is thus generated with good balance in the rotary electrical machine 1B, even when welding is performed with the positions of the position groups G3 as the connection positions 11. Accordingly, the operation characteristics of the rotary electrical machine 1B are good.

Similarly to Embodiment 1, there is no need for performing welding at the positions of all the position groups G3 from among the gcd(Q, P) position groups G3; herein, the positions of one or more position groups G3 may be set as the connection positions 11. In a case where the armature core 6 is made up of a plurality of split cores, the respective positions included in one or more position groups G3 from among the gcd(Q, P) position groups G3 may fee set as the connection positions 11, and several of the connection positions 11 may be matched to the positions of split faces 12, similarly to Embodiment 2.

By setting the positions of the slots 5, not the positions of the magnetic pole teeth 4, as the connection positions 11, the present Embodiment 3 elicits an effect similar to those of Embodiments 1 and 2 above, also when the armature core is formed by connection of a plurality of core pieces.

Embodiment 4

Figure 10:
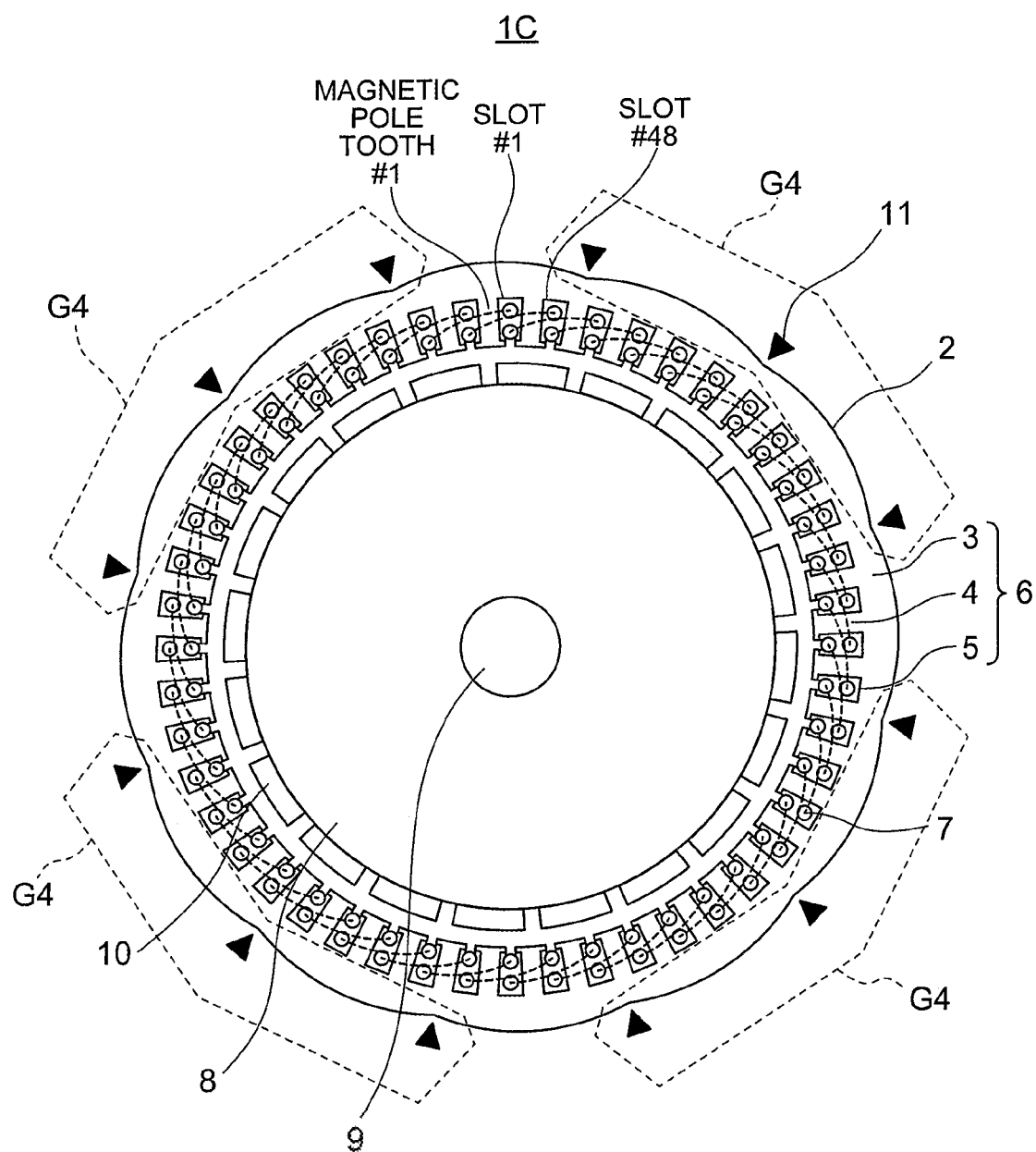
FIG. 10 is a plan-view diagram illustrating a rotary electrical machine of Embodiment 4 of the present invention.
Figure 11:
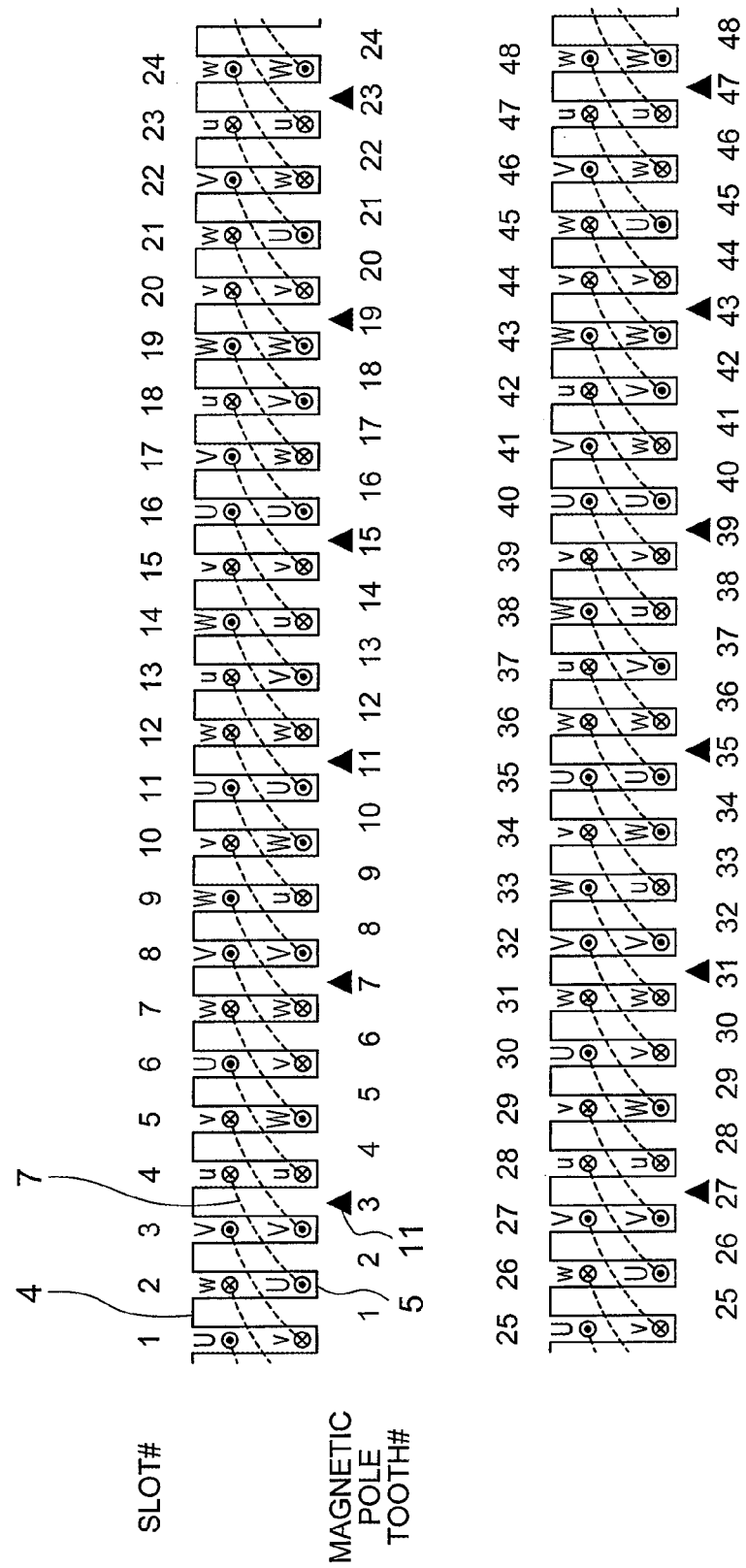
FIG. 11 is a linear developed-view diagram of the armature of FIG. 10.

In Embodiment 4 of the present invention, unlike in Embodiments 1 to 3 above, the positions of specific magnetic pole teeth from, among the plurality of magnetic pole teeth 4 is set as the connection positions 11. FIG. 10 is a plan-view diagram illustrating a rotary electrical machine 1C of Embodiment 4 of the present invention. FIG. 11 is a linear developed-view diagram of the armature 2 of FIG. 10. In FIG. 11 the armature 2 is virtually developed in a linear fashion for the purpose of explaining the coils 7 that are disposed in the slots 5 of the rotary electrical machine 1C.

The rotary electrical machine 1C is similar to the rotary electrical machine 1 of Embodiment 1, except for the positional relationship of the connection positions 11. Therefore, the arrangement of the coils 7 in the slots 5 in FIG. 10 is similar to that of Embodiment 1 above.

The rotary electrical machine 1C has number of slots Q=48 and number of magnetic poles P=20, and accordingly the number of slots q per pole per phase, according to Expression (1) is q=4/5, similarly to the rotary electrical machine 1.

Figure 12:
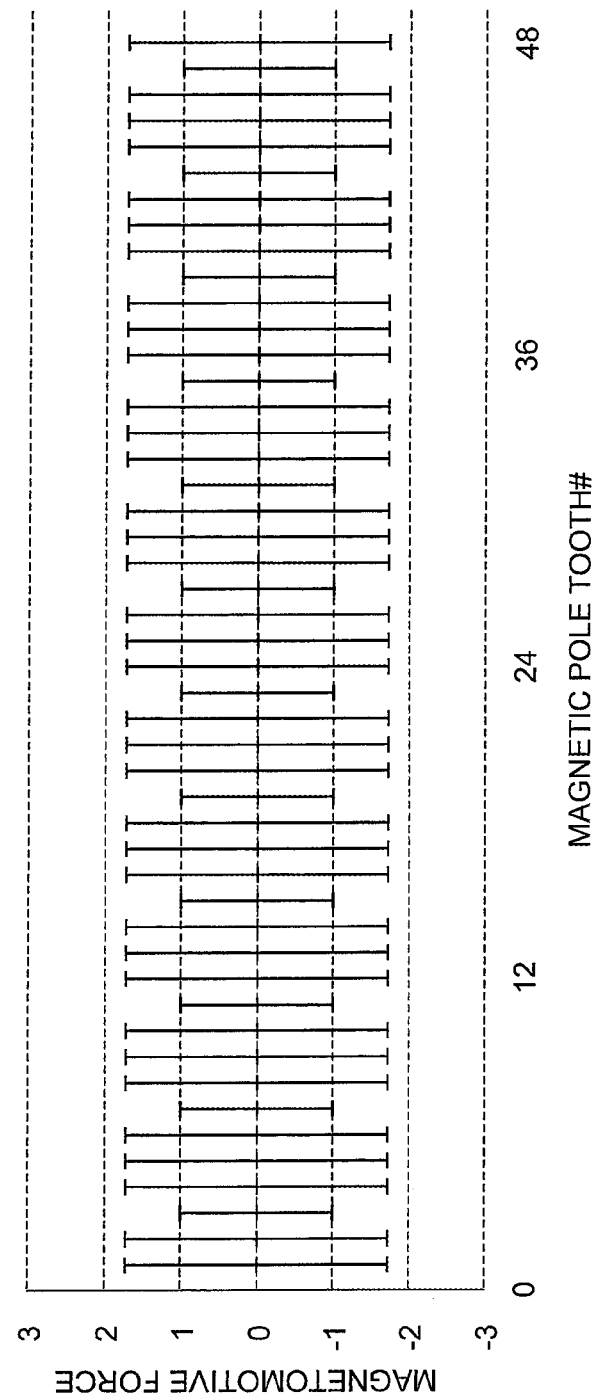
FIG. 12 is an explanatory diagram illustrating the amplitude of the magnetomotive force generated by coils that are wound around respective magnetic pole teeth in Embodiment 4 of the present invention.

FIG. 12 is an explanatory diagram illustrating the amplitude of the magnetomotive force generated by the coils 7 that are wound around the magnetic pole teeth 4, in Embodiment 4 of the present invention. To make the explanation easier to comprehend, the diagram illustrates theoretical values of magnetomotive force generated by the magnetic pole teeth 4, as a result of a calculation assuming the number of turns of the coils 7 in FIG. 12 to be one turn, and the magnitude of the current flowing in the coils 7 to be 1 A.

FIG. 12 reveals that the amplitude of the magnetomotive force generated by the coils 7 that are wound around the magnetic pole teeth 4 is not uniform. Focusing for instance on magnetic pole tooth #3, it is found that the amplitude of the magnetomotive force generated by magnetic pole tooth #3 is smaller than that of neighboring magnetic pole teeth 4. Focusing likewise on magnetic pole teeth #3, #7, #11 . . . , #47, it is found that magnetic pole teeth 4 of small amplitude of magnetomotive force appear at every four teeth. For convenience of explanation, such magnetic pole teeth 4 of smaller amplitude of magnetomotive force than that of neighboring teeth will be referred to as specific magnetic pole teeth.

A combined magnetomotive force generated by each magnetic pole tooth 4 will be considered next. The combined magnetomotive force generated by a magnetic pole tooth 4 is the sum of the magnetomotive forces generated by respective coils 7 that are wound, around that magnetic pole tooth 4. Focusing for instance on magnetic pole tooth #3, the combined magnetomotive force is the magnetomotive force resulting from summating the magnetomotive force generated by the coil 7 disposed in slot #2 and slot #4 (i.e. U phase coil) and the magnetomotive force generated by the coil 7 disposed in slot #3 and slot #5 (i.e. V phase coil).

Further, a maximum electrical angle phase difference β° is defined as the largest difference from among the phase differences between the electrical angle phase of the combined magnetomotive force generated by respective magnetic pole teeth 4 and the electrical angle phases of magnetomotive forces generated by the respective coils 7 wound around these magnetic pole teeth 4. Herein the larger the maximum electrical angle phase difference β°, the smaller becomes the combined magnetomotive force that is generated by the magnetic pole teeth 4.

The maximum electrical angle phase difference β° will be explained next with reference to FIG. 13. FIG. 13 is a set of explanatory diagrams for explaining the maximum electrical angle phase difference β° in Embodiment 4 of the present invention.

In order to facilitate the explanation of the maximum electrical angle phase difference β in FIG. 13, an armature 2' in which the coils are wound in a manner different from that of the armature 2 will be considered herein as an example of an ordinary armature in which coils are disposed in slots on the basis of a distributed winding scheme. Further, the number of turns of each coil 7' is set to one turn, and the magnitude of the current flowing in the coils 7' to 1 A.

In the armature 2', the coils 7' are wound on an armature core 6' in a two-layer lap winding state, such that each coil end of a respective coil 7' straddles three magnetic pole teeth 4'. Magnetomotive force is generated in magnetic pole tooth #α, since three coils A to G are wound around a magnetic pole tooth #α.

The vector diagram of FIG. 13 illustrates the magnetomotive forces generated by coils A to C at a given point in time, and the combined magnetomotive force resulting from combining the foregoing magnetomotive forces, As an example, the numbers of turns are identical among coils A to C, and the magnitudes of the currents flowing in coils A to C are also identical. Accordingly, the magnitudes of the magnetomotive force vectors of coils A to C are likewise identical. The phase of the combined magnetomotive force is 45°, assuming 0°, 30° and 105° as the electrical angle phases of the magnetomotive forces generated by coils A to C. In this case, the phase differences between the combined, magnetomotive force and the magnetomotive forces generated by coils A to 0 are 45°, 15° and 60°, respectively; the phase difference between the combined magnetomotive force and the magnetomotive force generated by coil C is thus largest.

Therefore, the maximum electrical angle phase difference β° is 60°, among the phase differences between the electrical angle phase of the combined magnetomotive force generated by magnetic pole tooth #α and the electrical angle phases of the magnetomotive forces generated by coils A to C that are wound around magnetic pole tooth #α. The greater the phase differences of the magnetomotive force vectors of coils A to C, the smaller the combined magnetomotive force becomes. In other words, the larger the maximum electrical angle phase difference the smaller becomes the combined magnetomotive force that is generated by magnetic pole tooth #α.

Returning to the explanation of FIG. 10, the electrical angle per rotation of the rotary electrical machine 1C is determined by the number of magnetic poles P. The coils 7 are disposed in the slots 5 relative to these magnetic poles, and accordingly the combined magnetomotive force generated by the magnetic pole teeth 4 is determined depending on the number of magnetic poles P and the number of slots Q.

Based on the above considerations, the inventors found that in a case where the coils 7 are disposed in the slots 5 on the basis of a distributed winding scheme, specific magnetic pole teeth appear in accordance with Rule (1) below, depending on the number of slots Q and number of magnetic poles P.

Rule (1)

The specific magnetic pole teeth appear regularly every qc positions in the circumferential direction of the armature 2, where qc denotes the numerator of the number of slots q per pole per phase of the rotary electrical machine 1 in which the coils 7 are disposed in the slots 5 on the basis of a distributed winding scheme.

In other words, magnetic pole teeth 4 such that the maximum electrical angle phase difference β° thereof is largest appear regularly, as the specific magnetic pole teeth, every qc slots.

In the present Embodiment 1, an example is illustrated in which the number of slots q per pole per phase of the rotary electrical machine 1 is 4/5, and accordingly the numerator qc of the number of slots q per pole per phase is 4. As illustrated in FIG. 12, the specific magnetic pole teeth appear at every four positions in the circumferential direction of the armature 2, and accordingly Rule (1) is satisfied.

The numerator qc of the number of slots q per pole per phase can be expressed as given by Expression (5) below.

[Math. 5]

$$qc = \frac{Q}{gcd(Q, P) \times m} \quad (5)$$

The specific magnetic pole teeth appears at regular intervals in the armature 2, and accordingly Rule (1) can be rewritten as Rule (1') below, through the use of machine angle.

Rule (1')

Specific magnetic pole teeth appear at regular intervals, at the angle pitch given by Expression (6), along the circumferential direction of the armature 2.

[Math. 6]

$$\text{Angle pitch} = \frac{360°}{gcd(Q, P) \times m} \quad (6)$$

Herein, Expression (7) below can be derived by substituting number of slots Q=48, number of magnetic poles P=20 and number of phases m=3 in Expression (6).

[Math. 7]

$$\text{Angle pitch} = \frac{360°}{gcd(Q, P) \times m} = \frac{360°}{4 \times 3} = 30° \quad (7)$$

In an armature 2 having a number of slots Q of 48, there appear specific magnetic pole teeth at every four positions in the circumferential direction of the armature 2, as illustrated in FIG. 12. Accordingly, the specific magnetic pole teeth appear at an angle pitch of 30°. Therefore, Rule (1') is satisfied.

The amplitude of the magnetomotive force of the specific magnetic pole teeth that appear according to Rule (1) and Rule (1') is smaller than that of magnetic pole teeth 4 other than the specific magnetic pole teeth.

Similarly to Embodiments 1 to 3 above, defining one position group G4 as the set of positions of m specific magnetic pole teeth, then there are formed gcd(Q, P) position groups G4 at equal pitch along the circumferential direction of the armature core 6. As given in Expression (7), four position groups G4, each being a set of positions of three specific magnetic pole teeth, appear at equal pitch along the circumferential direction or the armature core 6.

That is, the three adjacent specific magnetic pole teeth, included in respective four position groups G4, are magnetic pole teeth 4 that generate magnetomotive force respectively corresponding to each phase among the U phase, the V phase and the W phase. It is found that as a result the impact exerted on the operation characteristics of the rotary electrical machine 1 by distortion of teeth shape and changes in the gap distance between magnets 10 is smaller in the specific magnetic pole teeth than in other magnetic pole teeth 4.

In the present Embodiment 4, accordingly, the connection positions 11 are set to the respective positions of the specific magnetic pole teeth included in the gcd(Q, P) position groups G4 formed of the positions the specific magnetic pole teeth, which exert a smaller impact on the operation characteristics of the rotary electrical machine 1C than other magnetic pole teeth 4. Specifically, welding is performed at the connection positions 11 having been set herein to the positions, on the outer peripheral surface, of the portions of the core back 3 on which there are provided the specific magnetic pole teeth, i.e. magnetic pole teeth #3, #7 . . . , #47, as illustrated in FIG. 10.

By performing welding thus at such connection positions 11, it becomes possible to reduce the impact exerted on the operation characteristics of the rotary electrical machine as compared with an instance where welding is performed at positions of magnetic pole teeth 4 other than the specific magnetic pole teeth. That is, through welding at the positions of the specific magnetic pole teeth, the armature core 6 becomes formed by connection of the plurality of steel sheets to each other, and it becomes possible to further suppress impairment of the operation characteristics of the rotary electrical machine 1, derived from the occurrence of distortion in the armature core 6, as compared with conventional instances, while increasing the stiffness: of the armature core 6.

Figure 14:
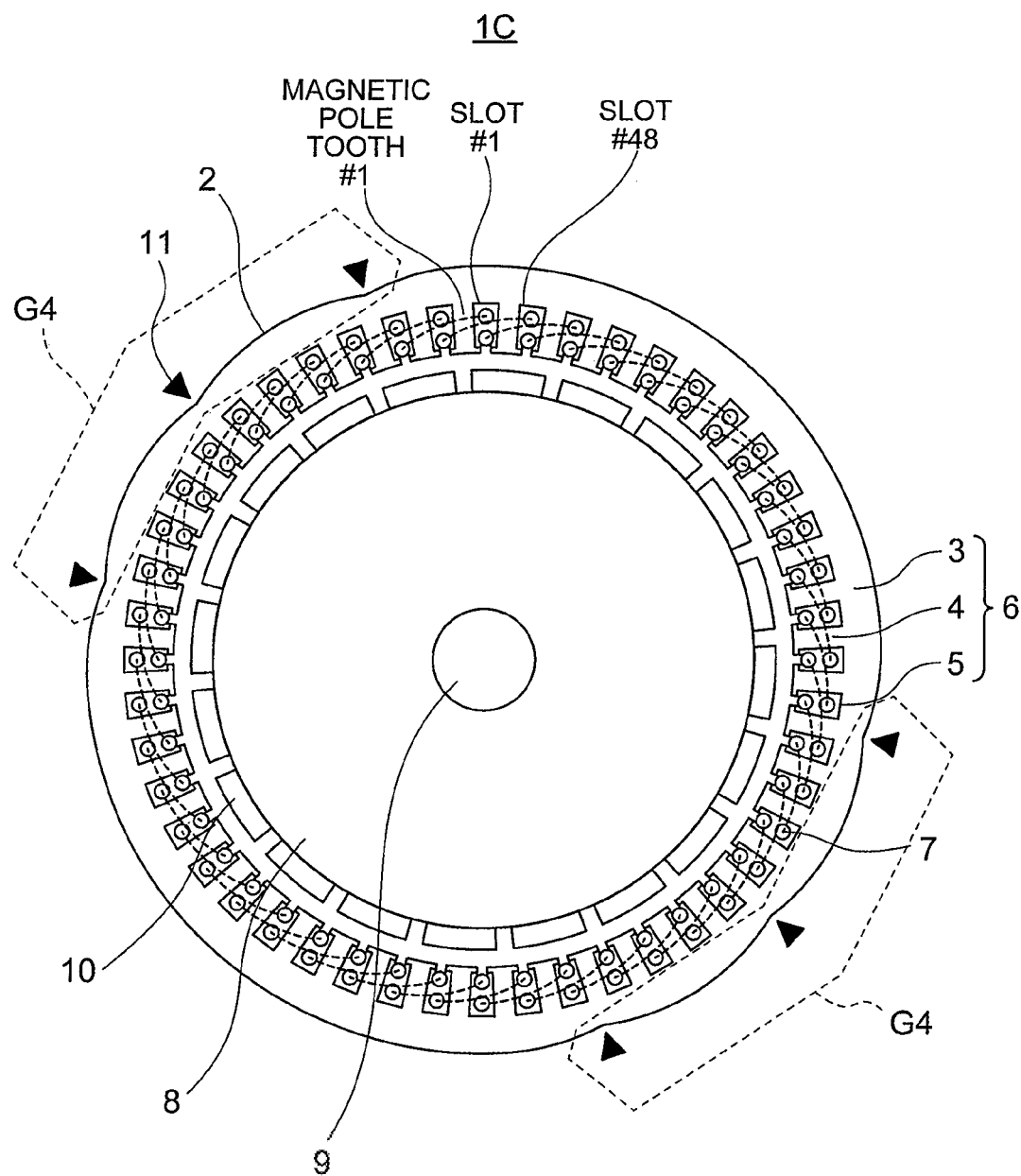
FIG. 14 is a plan-view diagram illustrating another example of the rotary electrical machine of Embodiment 4 of the present invention.

As another example of the rotary electrical machine 1C of the present Embodiment 4, the rotary electrical machine 1C may be configured as illustrated in FIG. 14. FIG. 14 is a plan-view diagram illustrating another example of the rotary electrical machine 1C of Embodiment 4 of the present invention.

As illustrated in FIG. 14, specifically, there is no need for performing welding at the positions of all the position groups G4 from among the gcd(Q, P) position groups G4; herein, the positions of one or more position groups G4 may be set as the connection positions 11, similarly to Embodiment 1.

In a case where the armature core 6 is made up of a plurality of split cores, the respective positions Included in one or more position groups G4 from among the gcd(Q, P) position, groups G4 may be set as the connection positions 11, and several of the connection positions 11 may be matched to the positions of split faces 12, similarly to Embodiment 2.

In a case thus where in the present Embodiment 4 a configuration is adopted in which the coils are assembled on the armature core on the basis of a distributed winding scheme, and taking a maximum electrical angle phase difference as the largest phase difference from among phase differences between the electrical angle phase of a combined magnetomotive force being the sum of the magnetomotive forces generated by respective coils wound around one magnetic pole tooth of the armature, and the electrical angle phases of the respective magnetomotive forces, then a plurality of core pieces (specifically, thin plate-like steel sheets) is connected, whereby the armature core becomes formed, at the positions of a plurality of specific magnetic pole teeth being magnetic pole teeth at which the maximum electrical angle phase difference is largest, from among the plurality of magnetic pole teeth.

It becomes as a result possible to obtain a rotary electrical machine that allows suppressing impairment of operation characteristics due to the occurrence of distortion in the armature core, as compared with conventional instances, also in a case where the armature core is formed by connection of a plurality of core pieces.

Embodiment 5

Figure 15:
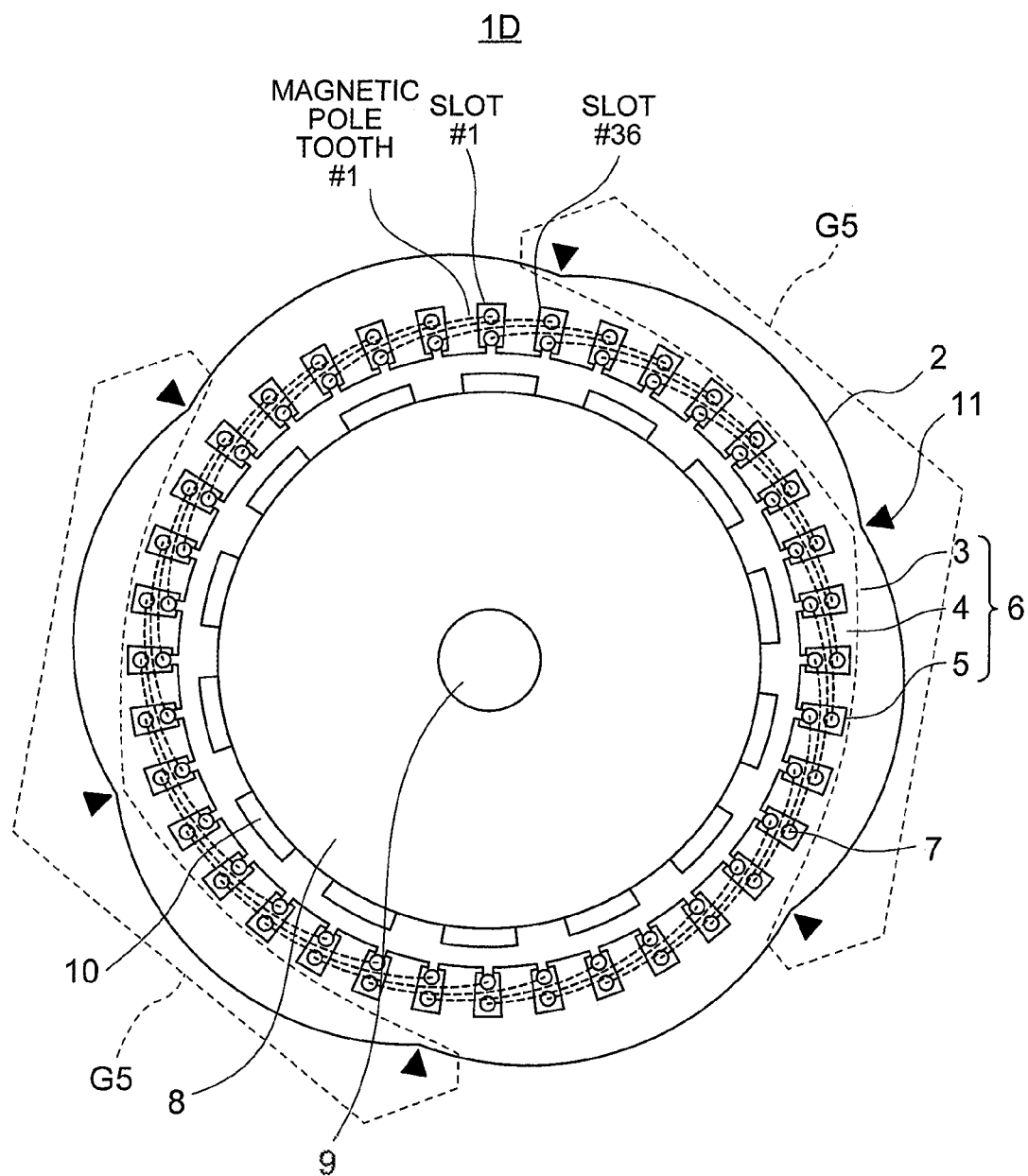
FIG. 15 is a plan-view diagram illustrating a rotary-electrical machine of Embodiment 5 of the present invention.
Figure 16:
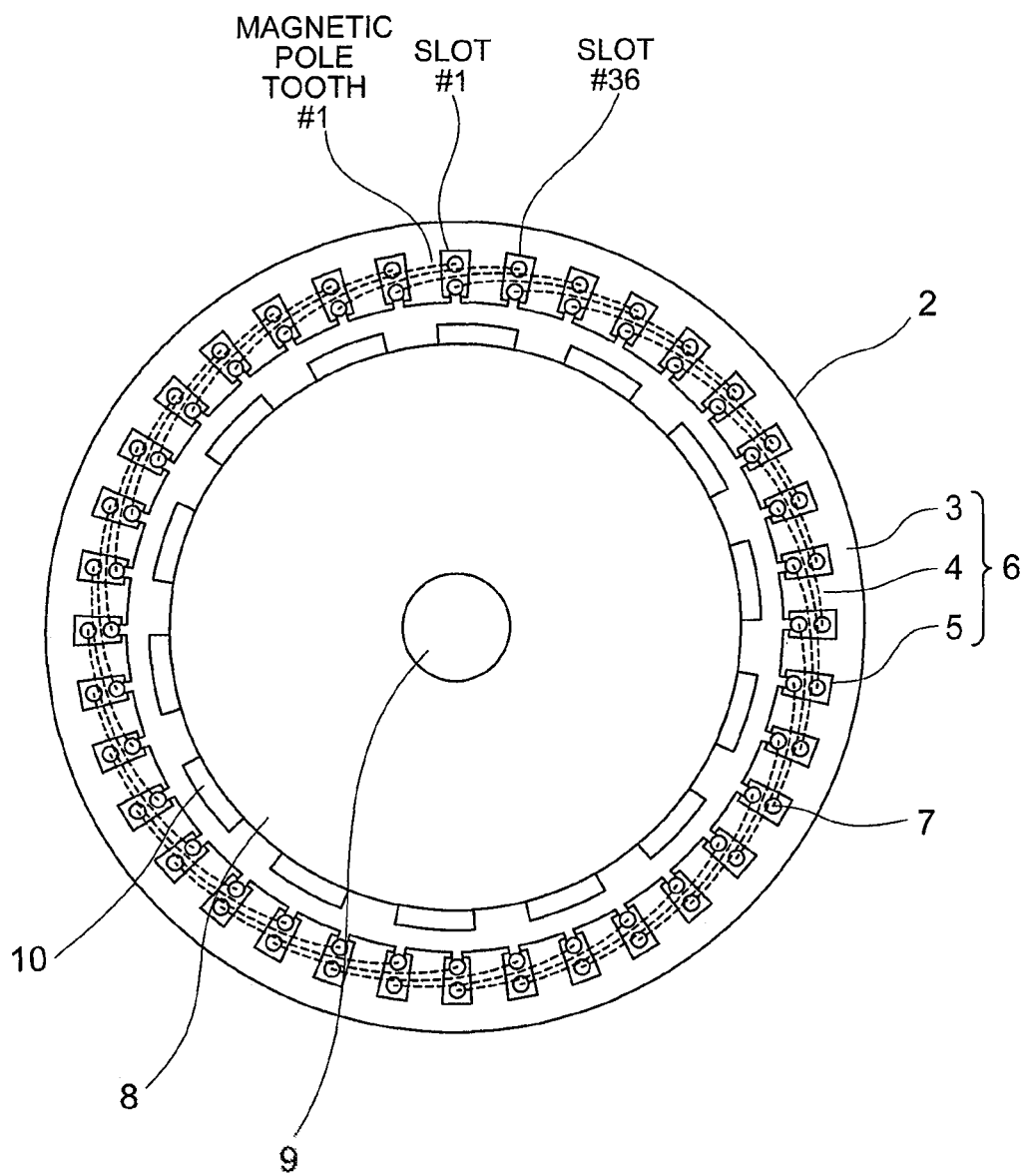
FIG. 16 is a plan-view diagram illustrating the rotary electrical machine of FIG. 15 without depicting connection positions or distortion of an armature core caused by welding.

The structure of a rotary electrical machine 1D in Embodiment 5 of the present invention differs from that of Embodiment 4 above. FIG. 15 is a plan-view diagram illustrating another example of a rotary electrical machine ID of Embodiment 5 of the present invention. FIG. 16 is a plan-view diagram illustrating the rotary electrical machine 1D of FIG. 15 without depicting distortion of the armature core 6 caused by welding with the connection positions 11.

In the present Embodiment 5 an instance will be explained in which the number of slots Q is 36 and the number of magnetic poles P is 14. In the present Embodiment 5, the coils 7 are disposed in the slots 5 on the basis of a two-layer lap winding scheme, similar to that of Embodiment 4 above, but the sites at which the coils 7 are disposed in the slots 5 differ from, those of Embodiment 4.

Figure 17:
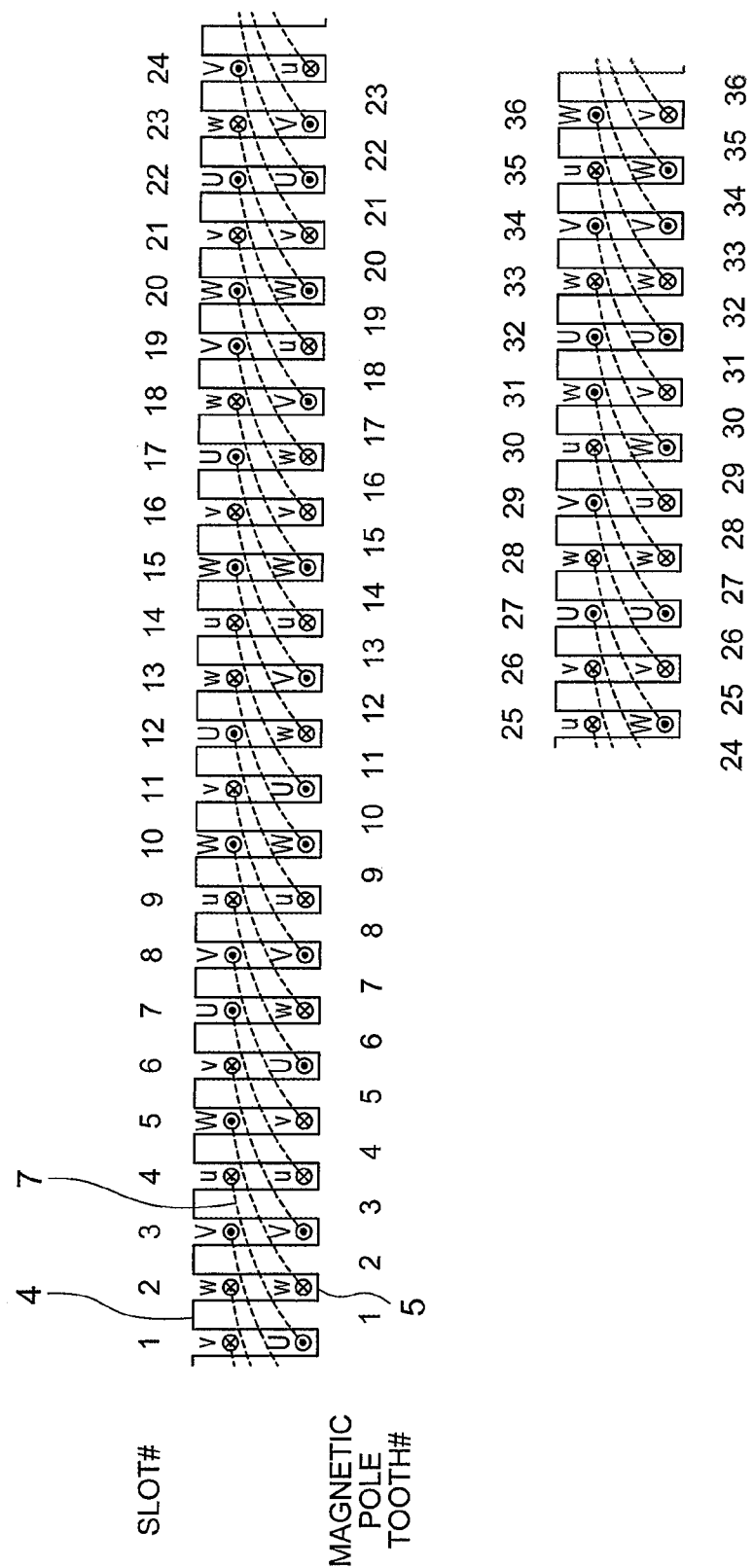
FIG. 17 is a linear developed-view diagram of the armature of FIG. 16.

A concrete arrangement example of the coils 7 in the slots 5 will be explained next. FIG. 17 is a linear developed-view diagram of the armature 2 of FIG. 16.

Similarly to FIG. 4 and FIG. 5 above, in FIG. 17 the armature 2 is virtually developed in a linear fashion for the purpose of explaining the coils 7 that are disposed in the slots 5 of the rotary electrical machine 1D. The meaning of the symbols in FIG. 17 is identical to that of FIG. 4 and FIG. 5.

Focus will be laid herein for instance on a coil 7 disposed in slot #2 and slot #5 and wound straddling magnetic pole tooth #2, magnetic pole tooth #3 and magnetic pole tooth #4. Herein, W-phase current flows in the coil 7 disposed in slot #2 and slot #5. Current flows in a depthwise orientation into the paper at the coil side of slot #2, and flows frontward from the paper at the coil side of slot #5.

Figure 18:
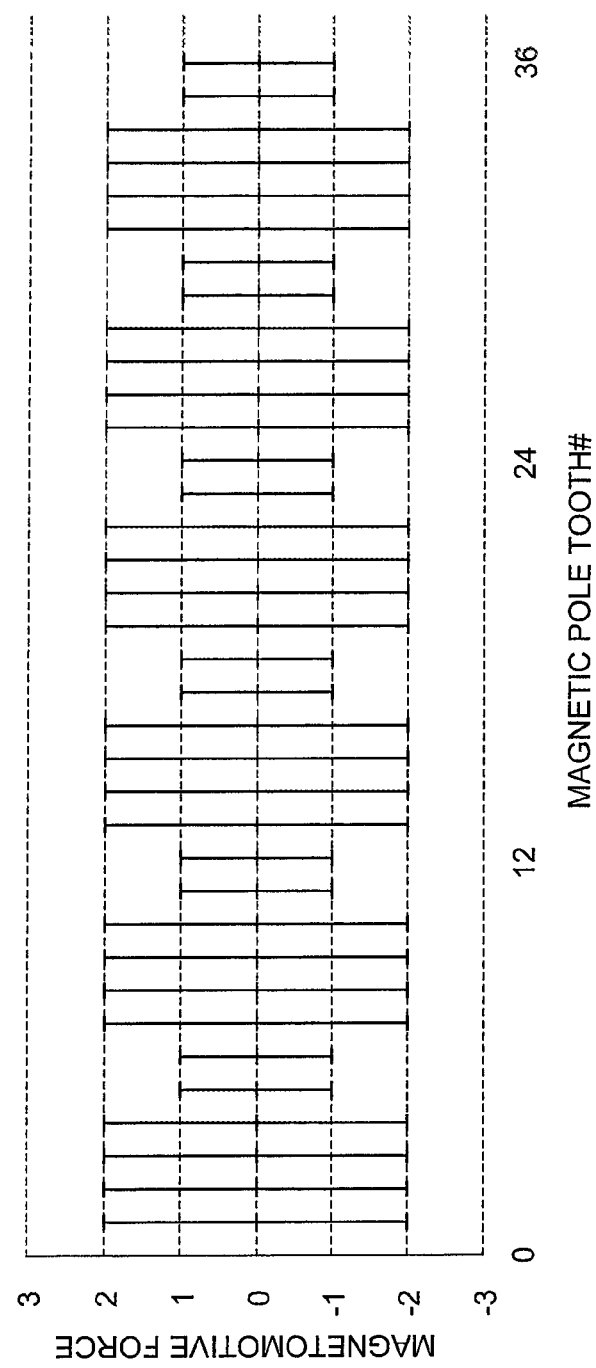
FIG. 18 is an explanatory diagram illustrating the amplitude of the magnetomotive force generated by coils that are wound around respective magnetic pole teeth in Embodiment 5 of the present invention.

Details of the connection positions 11 at which welding is performed in order to connect the plurality of steel sheets to each other will be explained next. FIG. 18 is an explanatory diagram illustrating the amplitude of the magnetomotive force generated by the coils 7 that are wound around the magnetic pole teeth 4, in Embodiment 5 of the present invention. To make the explanation easier to comprehend, the diagram illustrates theoretical values of magnetomotive force generated by the magnetic pole teeth 4, as a result of a calculation assuming the number of turns of the coils 7 in FIG. 18 to be one turn, and the magnitude of the current flowing in the coils 7 to be 1 A.

In a case where number of slots Q=36 and number of magnetic poles P=14, the number of slots q per pole per phase is q=6/7, as given by Expression (1).

FIG. 18 reveals that the amplitude of the magnetomotive force generated by the coils 7 that are wound around the magnetic pole teeth 4 is not uniform. Focusing for instance on magnetic pole tooth #5 and magnetic pole tooth #6, it is found that the amplitude of the magnetomotive force generated by magnetic pole tooth #5 and magnetic pole tooth #6 is smaller than that of neighboring magnetic pole teeth 4. Focusing on magnetic pole teeth #5 and #6, #11 and #12, . . . , #35 and #36, it is found that magnetic pole teeth 4 of small magnetomotive force amplitude appear at every six teeth.

In the present Embodiment 5, an example is illustrated in which the number of slots q per pole per phase of the rotary electrical machine 1C is 6/7, and accordingly the numerator qc of the number of slots q per pole per phase is 6, and Expression (5) is satisfied. Further, Rule (1) is satisfied since there appear specific magnetic pole teeth at every six positions in the circumferential direction of the armature 2, as illustrated in FIG. 18.

Next, Expression (8) below can be derived by substituting number of slots Q=36, number of magnetic poles P=14 and number of phases m=3 in Expression (6).

[Math. 8]

$$\text{Angle pitch} = \frac{360°}{gcd(Q, P) \times m} = \frac{360°}{2 \times 3} = 60° \qquad (8)$$

In an armature 2 having a number of slots Q of 36, there appear specific magnetic pole teeth at every six positions in the circumferential direction of the armature 2, as illustrated in FIG. 18. Accordingly, the specific magnetic pole teeth appear at an angle pitch of 60°. Therefore, Rule (1) is satisfied.

Similarly to Embodiment 4, thus, the specific magnetic pole teeth appear in accordance with Rule (1) and Rule (1').

Therefore, in a case where in the present Embodiment 5 specific magnetic pole teeth are adjacent, position groups G5 are formed of the positions of slots 5 provided between adjacent specific magnetic pole teeth in one set thereof. That is, one position group G5 is a set of the positions of m adjacent slots 5 at a pitch of [Q/{gcd(Q, P)×m}]. The connection positions 11 are set herein to positions of the respective slots 5 included in the gcd(Q, P) position groups G5 formed of the positions of the slots 5 provided between adjacent specific magnetic pole teeth. That is, welding is performed linearly at the connection positions 11 that are herein set to the positions, on the outer peripheral surface, of the portions of the core back 3 opposing slots #6, #12 ... , #36 among slots 5, as illustrated in FIG. 15.

In the present Embodiment 5, the connection positions 11 are set to the positions of the slots 5 provided between adjacent specific magnetic pole teeth, as illustrated in FIG. 15, but the connection positions 11 may be set to either one, or to both, of the positions of adjacent specific magnetic pole teeth. In a case where there appear two or more adjacent specific magnetic pole teeth, the connection positions 11 may be set to lie in the range in which these specific magnetic pole teeth are present. In a case where adjacent specific magnetic pole teeth are present, thus, the plurality of core pieces can be connected at the connection positions 11, which are set herein to the positions lying in the range at which adjacent specific magnetic pole teeth are present.

By performing thus at such connection positions 11, the plurality of steel sheets become connected to each other, to form the armature core 6, similarly to Embodiment 4, and it becomes possible to further suppress impairment of the operation characteristics of the rotary electrical machine 1, derived from the occurrence of distortion in the armature core 6, as compared with conventional instances, while increasing the stiffness of the armature core 6.

Further, there is no need for performing welding at the positions of all the position groups G5 from among the gcd(Q, P) position groups G5; herein, the positions of one or more position groups G5 may be set as the connection positions 11, similarly to Embodiment 1.

In a case, where the armature core 6 is made up of a plurality of split cores, the respective positions included in one or more position groups G5 from among the gcd(Q, P) position groups G5 may be set as the connection positions 11, and several of the connection positions 11 may be matched to the positions of split faces 12, similarly to Embodiment 2.

When in contrast to Embodiment 4 above the specific magnetic pole teeth in the present Embodiment 5 are adjacent to each other, the plurality of core pieces is connected at positions within a range in which adjacent specific magnetic pole teeth are present, instead of the positions of the specific magnetic pole teeth. An effect similar to that of Embodiment 4 is obtained as a result.

Embodiment 6

Figure 19:
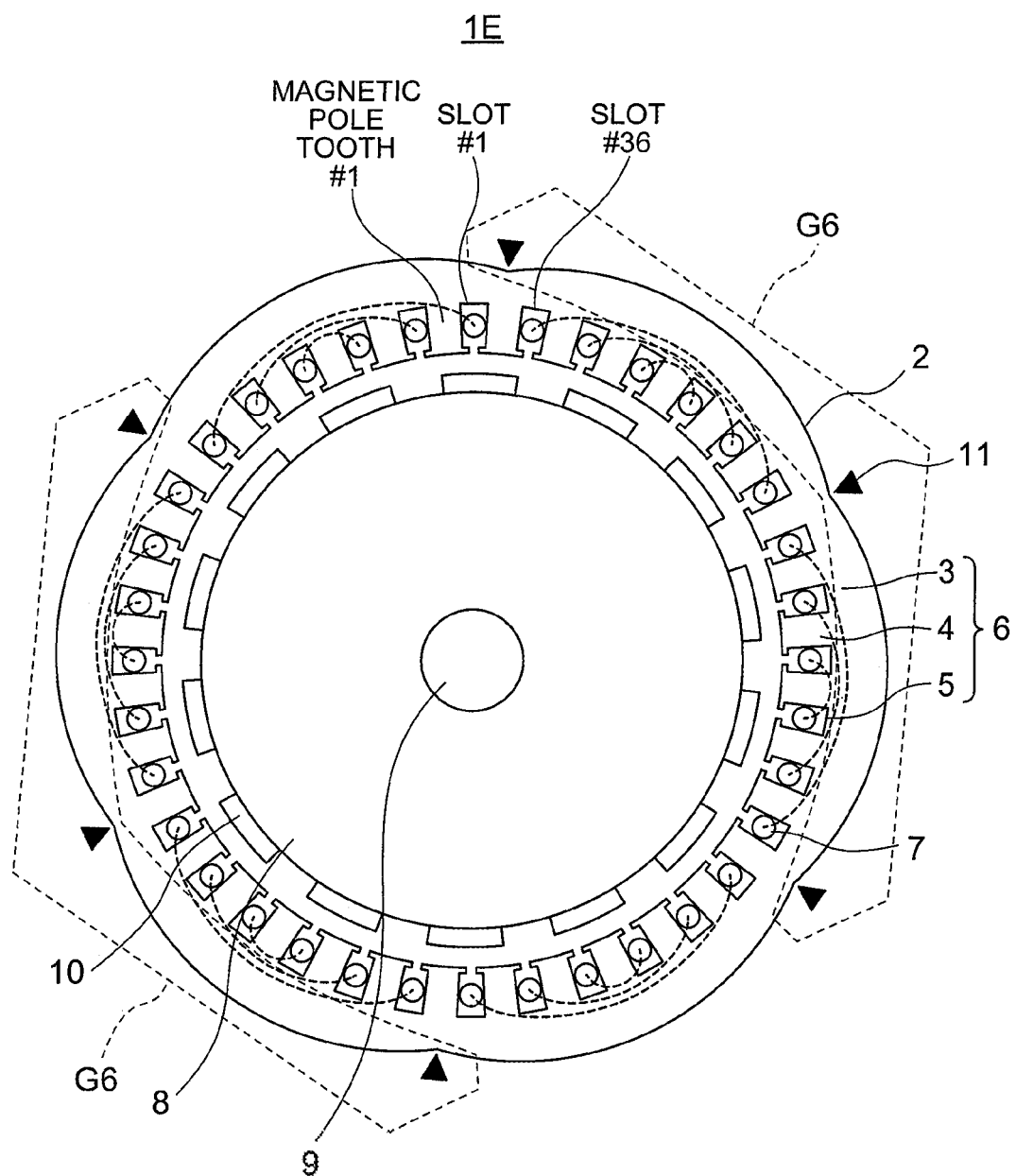
FIG. 19 is a plan-view diagram illustrating a rotary electrical machine of Embodiment 6 of the present invention.
Figure 20:
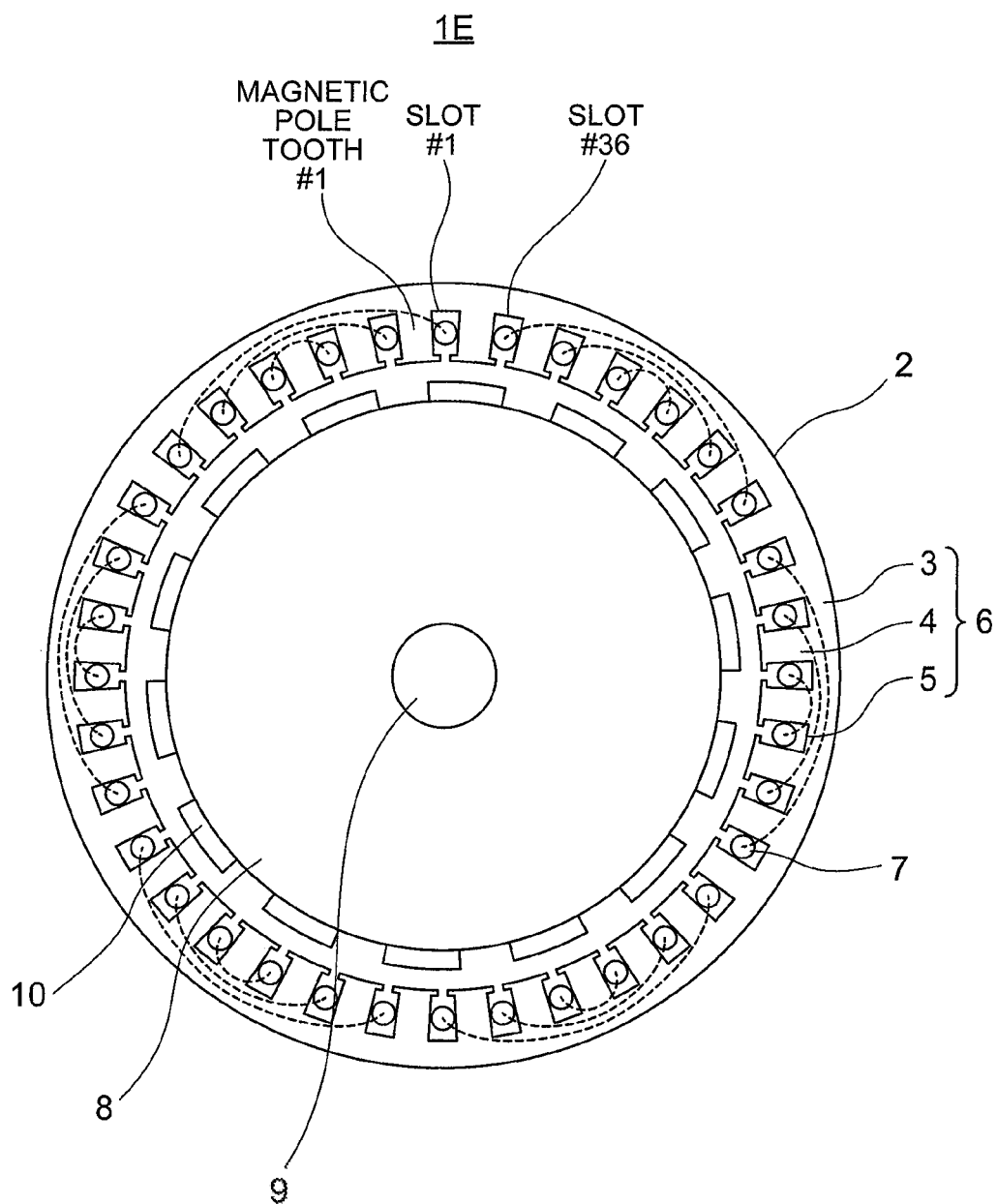
FIG. 20 is a plan-view diagram illustrating the rotary electrical machine of FIG. 19 without depicting connection positions or distortion of an armature core caused by welding.

The structure of a rotary electrical machine 1E in Embodiment 6 of the present invention differs from, those of Embodiments 1 to 5 above. FIG. 19 is a plan-view diagram illustrating a rotary electrical machine 1E of Embodiment 6 of the present invention. FIG. 20 is a plan-view diagram illustrating the rotary electrical machine 1E of FIG. 19 without depicting the distortion of the armature core 6 caused by welding with the connection positions 11.

In the present Embodiment 6 an instance will be explained in which the number of slots Q is 36 and the number of magnetic poles P is 14. Unlike in Embodiments 1 to 5, in the present Embodiment 6 the coils 7 axe disposed in the slots 5 on the basis of a concentric winding scheme.

Figure 21:
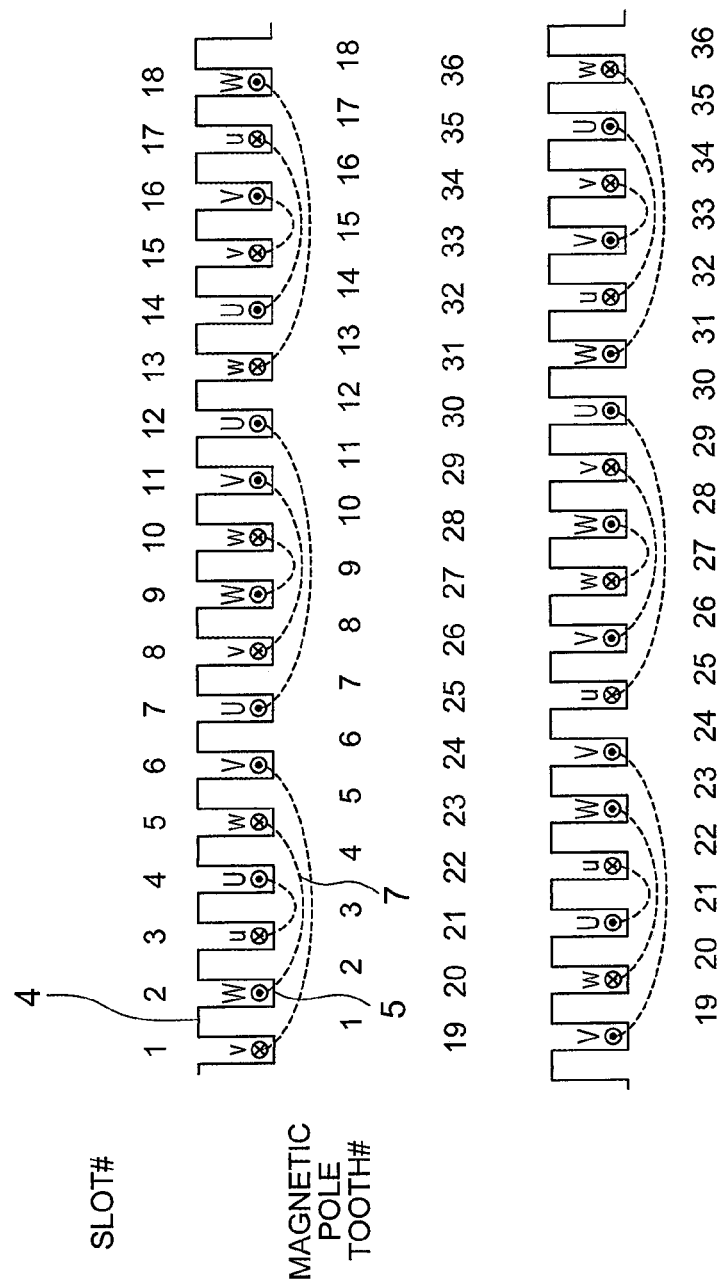
FIG. 21 is a linear developed-view diagram of the armature of FIG. 20.

A concrete arrangement example of the coils 7 in the slots 5 will be explained next. FIG. 21 is a linear developed-view diagram of the armature 2 of FIG. 20.

Similarly to FIG. 4 and FIG. 5 above, in FIG. 21 the armature 2 is virtually developed in a linear fashion for the purpose of explaining the coils 7 that are disposed in the slots 5 of the rotary electrical machine 1E. The meaning of the symbols in FIG. 21 is identical to that of FIG. 4 and FIG. 5. The coils are wound in the form of concentric arcs, each coil 7 being disposed, for one respective phase, in a respective slot 5.

Focus will be laid herein for instance on a coil 7 disposed in slot #2 and slot #5 and wound straddling magnetic pole tooth #2, magnetic pole tooth #3 and magnetic poles tooth #4. Herein, W-phase current flows in the coil 7 disposed in slot #2 and slot #5. Current flows in a frontward orientation from the paper at the coil side of slot #2, and flows depthwise into the paper at the coil side of slot #5.

Figure 22:
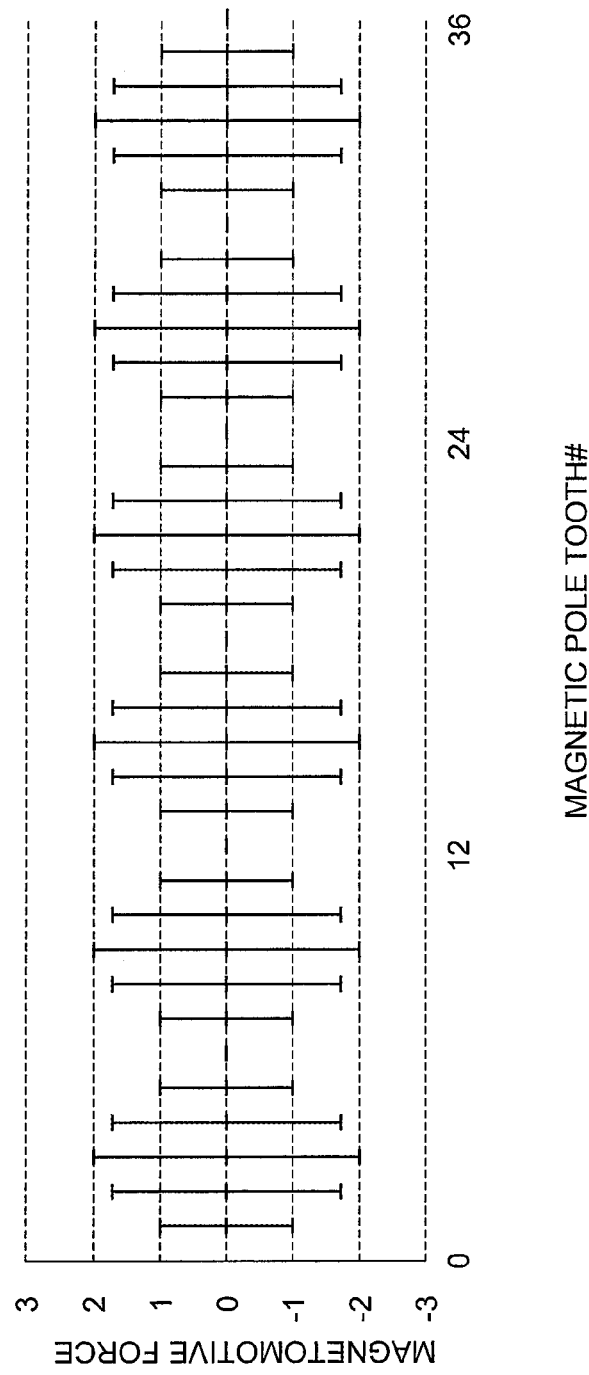
FIG. 22 is an explanatory diagram illustrating the amplitude of the magnetomotive force generated by coils that are wound around respective magnetic pole teeth in Embodiment 6 of the present invention.

Details of the connection positions 11 at which welding is performed in order to connect the plurality of steel sheets to each other will be explained next. FIG. 22 is an explanatory diagram illustrating the amplitude of the magnetomotive force generated by the coils 7 that are wound around the magnetic pole teeth 4, in Embodiment 6 of the present invention. To make the explanation easier to comprehend, the diagram illustrates theoretical values of magnetomotive force generated by the magnetic pole teeth 4, as a result of a calculation assuming the number of turns of the coils 7 in FIG. 22 to be one turn, and the magnitude of the current flowing in the coils 7 to be 1 A.

In a case where number of slots Q=36 and number of magnetic poles P=14, the number of slots q per pole per phase is q=6/7, as given by Expression (1).

FIG. 22 reveals that the amplitude of the magnetomotive force generated by the coils 7 that are wound around the magnetic pole teeth 4 is not uniform. Focusing for instance on magnetic pole tooth #6, it is found that the magnetomotive force generated by magnetic pole tooth #6 is zero, i.e. that no magnetomotive force, is generated at magnetic pole tooth #6. Focusing further on magnetic pole teeth #6, #12 ... , #36, it is found that magnetic pole teeth 4 at which no magnetomotive force is generated appear, as specific magnetic pole teeth, every six teeth.

In the present Embodiment 6 an example is illustrated in which the number of slots q per pole per phase of the rotary electrical machine 1E is 6/7, and accordingly the numerator qc of the number of slots q per pole per phase is 6, and Expression (5) is satisfied. Further, Rule (1) is satisfied since there appear specific magnetic pole teeth at every six positions in the circumferential direction of the armature 2, as illustrated in FIG. 22. The specific magnetic pole teeth appear at a pitch of [Q/{gcd(Q, P)×m}], and accordingly the position groups G6 are formed of the positions of the specific magnetic pole teeth, similarly to Embodiment 4.

Next, Expression (9) below can be derived by substituting number of slots Q=35, number of magnetic poles P=14 and number of phases m=3 in Expression (6).

[Math. 9]

$$\text{Angle pitch} = \frac{360°}{gcd(Q, P) \times m} = \frac{360°}{2 \times 3} = 60° \quad (9)$$

In an armature 2 having a number of slots Q of 36, there appear specific magnetic pole teeth at every six positions in the circumferential direction of the armature 2, as illustrated in FIG. 22. Accordingly, the specific magnetic pole teeth appear at an angle pitch of 60°. Therefore, Rule (1') is satisfied.

Similarly to Embodiment 4, thus, the specific magnetic pole teeth appear in accordance with Rule (1) and Rule (1').

In the present Embodiment 6, therefore, the position groups G6 are formed of the positions of the specific magnetic pole teeth. That is, one position group G6 is a set, of the positions of m adjacent specific magnetic pole teeth at a pitch of [Q/{gcd(Q, P)×m}]. The connection, positions 11 are set to the positions of the respective specific magnetic pole teeth included in the gcd(Q, P) position groups G6 formed of the positions of the specific magnetic pole teeth. That is, welding is performed linearly at the connection positions 11 having been set herein to the positions, on the outer peripheral surface, of the portions of the core back 3 on which there are provided the specific magnetic pole teeth, i.e. magnetic pole teeth #6, #12 . . . , #36, as illustrated in FIG. 19.

By performing welding thus at such connection positions 11, the plurality of steel sheets become connected to each other, to form the armature core 6, similarly to Embodiment 4, and it becomes possible to further suppress impairment of the operation characteristics of the rotary electrical machine 1E, derived from the occurrence of distortion in the armature core 6, as compared with conventional instances, while increasing the stiffness of the armature core 6.

It is thus found that the inventions according to Embodiments 4 and 5 can be used in the rotary electrical machine 1E in which the coils 7 are disposed in the slots 5 on the basis of a concentric winding scheme, but also the inventions according to Embodiments 1 to 3 can be used herein.

The electrical angle phase of the magnetic pole teeth 4 of the armature 2 is determined, by Expression (2), similarly to rotary electrical machines illustrated in Embodiments 1 to 5, having coils 7 in a two-layer lap winding scheme, i.e. is determined by the number of slots Q and the number of magnetic poles P.

The electrical angle of the magnetic pole teeth 4 at positions spaced from each other by [Q/{gcd(Q/P)×m}] positions from magnetic pole tooth #1 is as given by Expression (10), assuming the electrical angle of magnetic pole tooth #1 to be 0°.

[Math. 10]

$$\frac{P}{gcd(Q, P) \times m} \times 180° = \frac{P}{gcd(Q, P)} \times 60° \quad (10)$$

Herein Expression (1) is identical to Expression (3). Specifically, the position groups G6 can be formed similarly to a rotary electrical machine in which the coils 7 are assembled onto the armature core 6 by two-layer lap winding, also in the rotary electrical machine 1E in which the coils 7 are assembled in concentrated winding onto the armature core 6, as in the present Embodiment 6. Specifically, the position groups G6, each being a set of respective positions of m magnetic pole teeth spaced from each other at a pitch of [Q/{gcd(Q, P)×m}], are formed divided into gcd(Q, P) groups.

Therefore, the inventions in Embodiments 1 to 3 above can be used in the rotary electrical machine 1E, and an identical effect can be achieved in a case where the connection positions 11 are disposed in the same way as in Embodiments 1 to 3.

An effect identical to those of Embodiments 1 to 5 is achieved in the present. Embodiment 6, where, unlike in Embodiments 1 to 5, the coils are disposed in the slots on the basis of a concentric winding scheme. It is thus found that the invention of the present application can be used also in cases where the coils are assembled onto the armature core according to a concentric winding configuration, while in distributed winding, the invention of the present application, can be used regardless of the specific winding scheme, for instance two-layer lap winding or the like.

Embodiment 7

Figure 23:
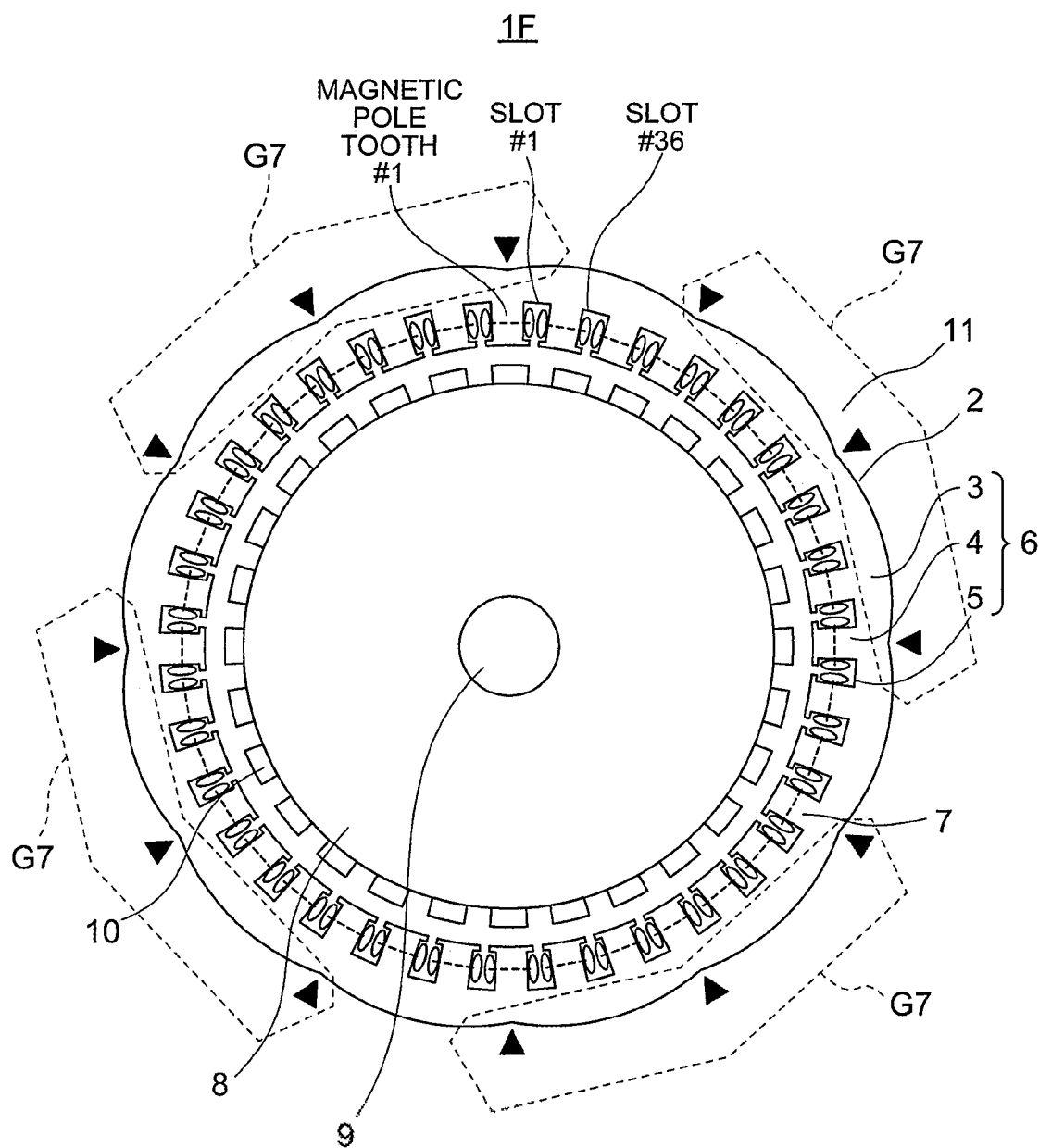
FIG. 23 is a plan-view diagram illustrating a rotary electrical machine of Embodiment 7 of the present invention.
Figure 24:
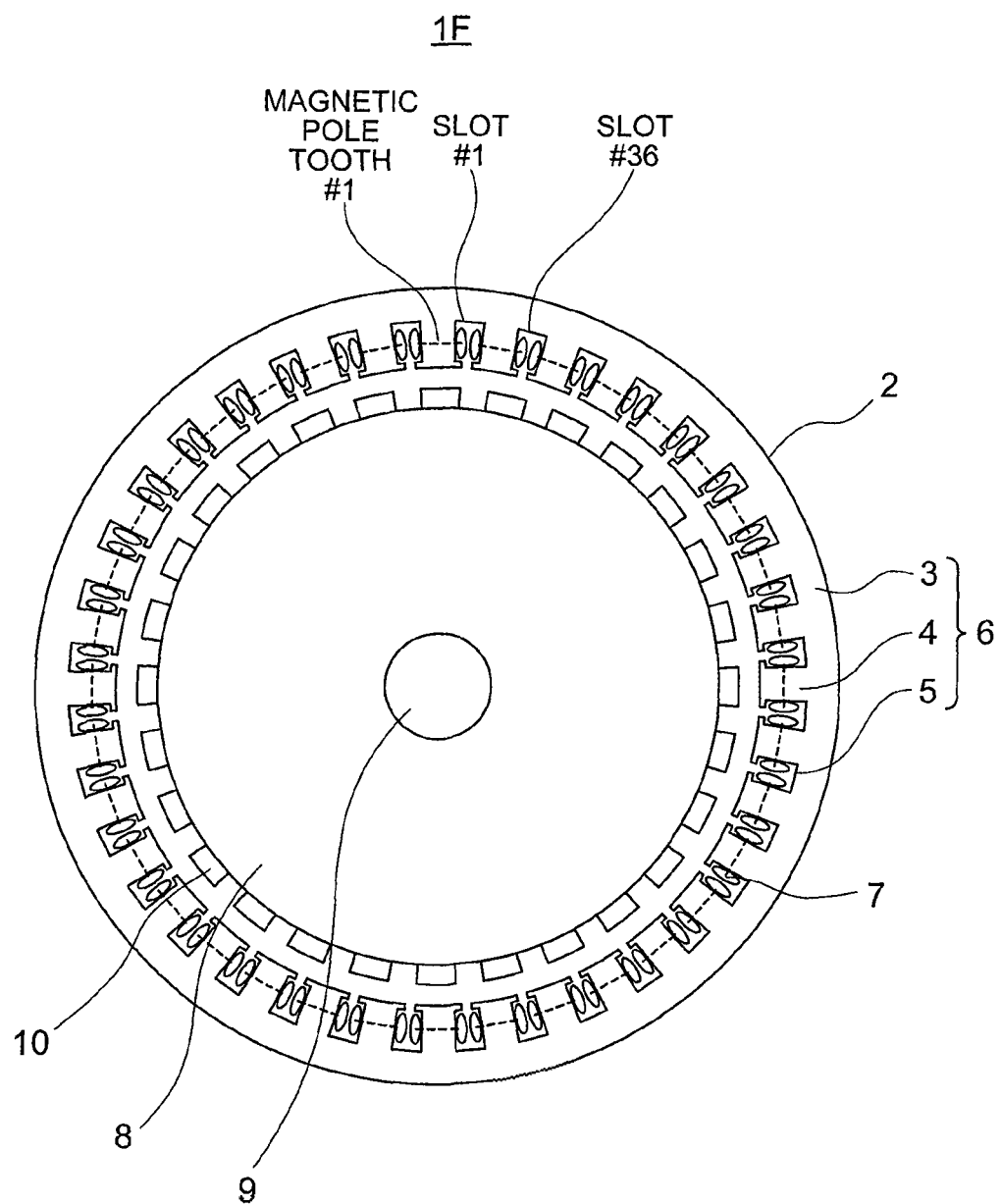
FIG. 24 is a plan-view diagram illustrating the rotary electrical machine of FIG. 23 without depicting connection positions or distortion or an armature core caused by welding.

The structure of a rotary electrical machine 1F in Embodiment 7 of the present invention differs from those of Embodiments 1 to 6 above. FIG. 23 is a plan-view diagram illustrating a rotary electrical machine 1F of Embodiment 7 of the present invention. FIG. 24 is a plan-view diagram illustrating the rotary electrical machine 1F of FIG. 23 without depicting the distortion of the armature core 6 caused by welding with the connection positions 11.

In the present Embodiment 7 an instance will be explained in which the number of slots Q is 36 and the number of magnetic poles P is 28. Unlike in Embodiments 1 to 6, in the present Embodiment 7 the coils 7 are disposed in the slots 5 on the basis of a concentrated winding scheme.

Figure 25:
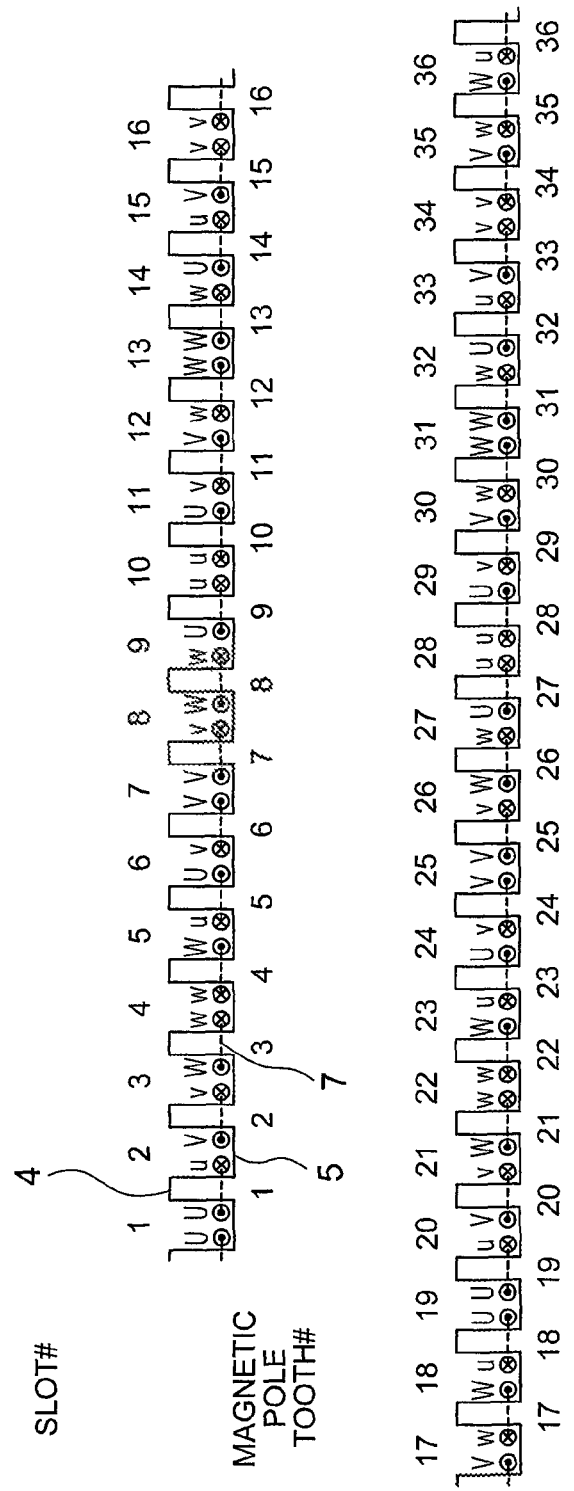
FIG. 25 is a linear developed-view diagram of the armature of FIG. 24.

A concrete arrangement example of the coils 7 in the slots 5 will be explained next. FIG. 25 is a linear developed view diagram of the armature 2 of FIG. 24.

Similarly to FIG. 4 and FIG. 5 above, in FIG. 25 the armature 2 is virtually developed in a linear fashion for the purpose of explaining the coils 7 that are disposed in the slots 5 of the rotary electrical machine 1F. Specifically, the coils are wound in a concentrated fashion around the magnetic pole teeth 4, such that coils 7 of two respective phases are disposed in each slot 5.

For instance, focus will be laid herein on coils 7 disposed in slot #2 and slot #3 and being wound around magnetic pole tooth #2 in a concentrated manner. Herein, V– phase current flows in the coils 7 disposed in slot #2 and slot #3. Current flows in a frontward orientation from the paper at the coil side of slot #2, and flows depthwise into the paper at the coil side of slot #3.

Details of the connection positions 11 at which welding is performed in order to connect the plurality of steel sheets to each other will be explained next.

The electrical angle phase of the magnetic pole teeth 4 of the armature 2 is determined by Expression (11), i.e., by the number of slots Q and the number of magnetic poles P, similarly to the rotary electrical machines illustrated in Embodiments 1 to 6 having coils 7 on the basis of a distributed winding scheme.

[Math. 11]

$$\frac{P}{Q} \times 180° \quad (11)$$

Herein, the electrical angle of the magnetic pole teeth 4 at positions spaced from each other by [Q/{gcd(Q, P)×m}] positions from magnetic pole tooth #1 is as given by Expression (12) below, assuming, the electrical angle of magnetic pole tooth #1 to be 0°.

[Math. 12]

$$\frac{P}{gcd(Q,P) \times m} \times 180° = \frac{P}{gcd(Q,P)} \times 60° \quad (12)$$

Herein Expression (12) is identical to Expression (3). That is, the position groups G7 can be formed, similarly to a rotary electrical machine in which the coils 7 are assembled onto the armature core 6 by distributed winding, also in the rotary electrical machine if in which the coils 7 are assembled, onto the armature core 6 by concentrated winding, as in the present Embodiment 7. Specifically, the position groups G7, each being a set of positions of respective m magnetic pole teeth 4 spaced from each other by a pitch of [Q/{gcd(Q, P)×m}], are formed divided into gcd(Q, P) groups.

In the present Embodiment 7, therefore, the connection positions 11 are set to the respective positions of the magnetic pole teeth 4 included in the gcd(Q, P) position groups G7, similarly to Embodiment 1. That is, welding is performed linearly at the connection positions 11 that are herein set to the positions, on the outer peripheral surface, of the portions of the core back 3 at which magnetic pole teeth #1, #4 ..., #34 are provided, as illustrated in FIG. 23.

Figure 26:
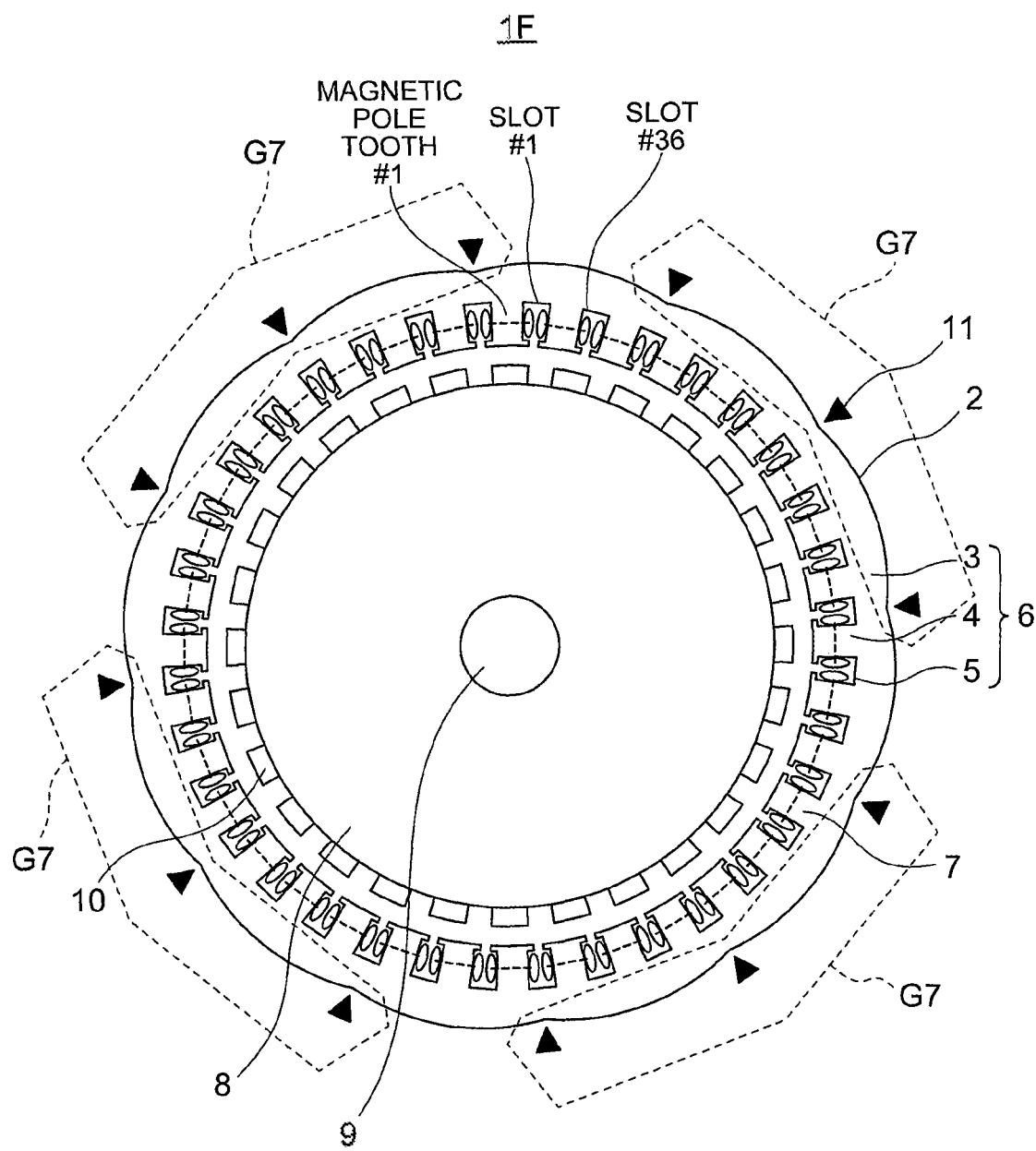
FIG. 26 is a plan-view diagram illustrating another example of the rotary electrical machine of Embodiment 7 of the present invention.

As depicted in FIG. 26, the rotary electrical machine 1F may be configured in the same way as in Embodiment 3. FIG. 26 is a plan-view diagram illustrating another example of the rotary electrical machine 1F of Embodiment 7 of the present invention.

That is, the connection positions 11 are set to the positions of the respective slots 5 included in the gcd(Q, P) position groups G7, in a case where the position groups G7, each, being a set of the respective positions of m slots 5 spaced from each other by a pitch of [Q/{gcd(Q, P)×m}], are formed divided into gcd(Q, P) groups.

That is, welding is performed linearly at the connection positions 11 that are herein set to the positions, an the outer peripheral surface, of the portions of the core back 3 of slots #2, #5, ..., #35, as illustrated in FIG. 26.

Thus, the inventions in Embodiments 1 to 3 above can be used in the rotary electrical machine 1F, and an identical effect can be achieved in a case where the connection positions 11 are disposed in the same way as in Embodiments 1 to 3.

Through, arrangement of the connection positions in the same way as in Embodiments 1 to 3, the present Embodiment 7 elicits a similar effect, even in a case where the coils are disposed in the slots on the basis of a concentrated winding scheme.

In the present Embodiments 1 to 7, instances have been explained in which the armature core 6 is formed through welding at the connection positions 11, welding being herein an example of a method for connecting a plurality of core pieces, but the present invention is not limited thereto. Specifically, the armature core 6 may be formed by connection of the plurality of core pieces by some other method, for instance fixing by crimping, or using pins, instead of by welding at the connection positions 11.

Figure 27:
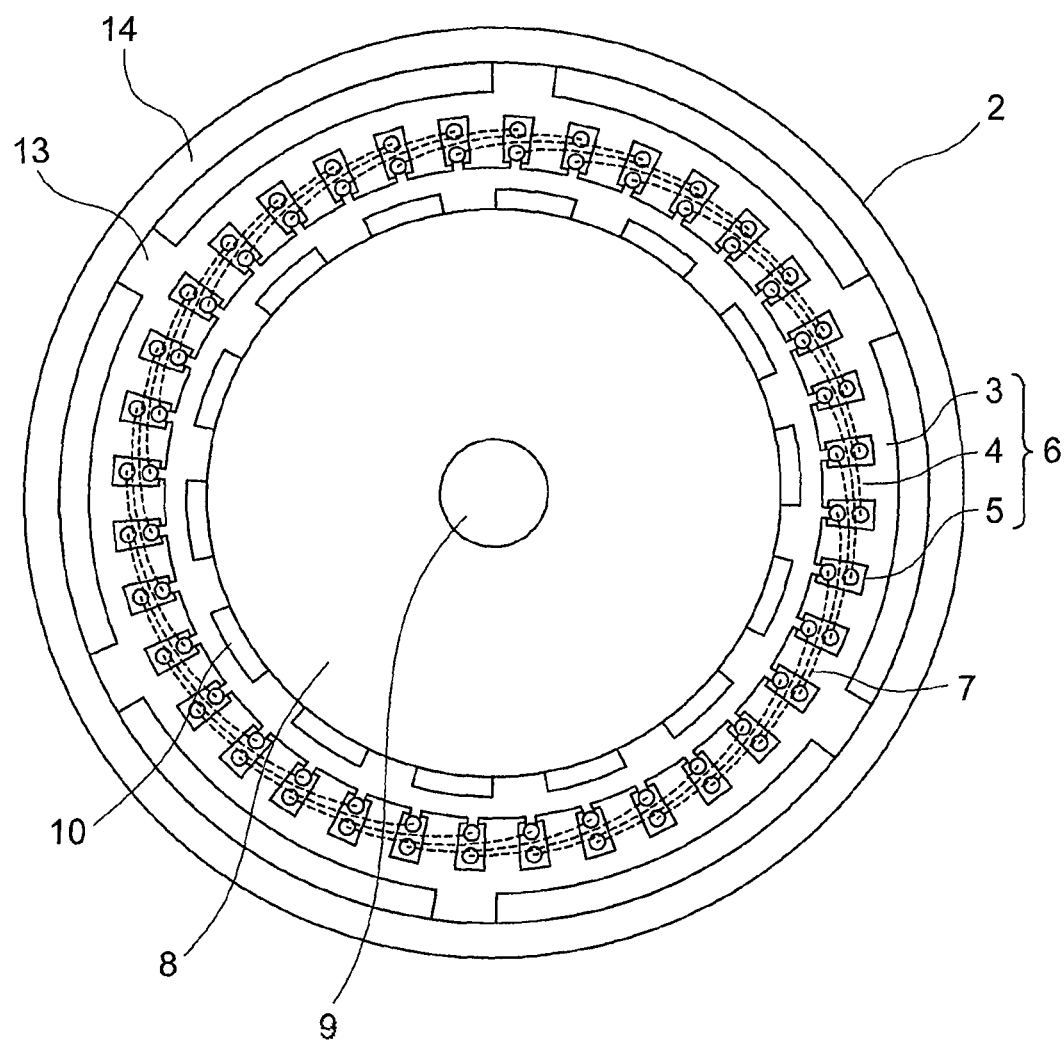
FIG. 27 is a plan-view diagram illustrating a rotary electrical machine in another implementation different from those of the rotary electrical machines of Embodiments 1 to 7 of the present invention.

In the present Embodiments 1 to 7, fixing parts 13 for, for instance, fixing the armature core 6 and for press-fitting of the armature core 6 to the housing case 14 that holds the latter may be provided, as illustrated in FIG. 27, at positions included in one or more position groups from among the gcd(Q, P) position groups. FIG. 27 is a plan-view diagram illustrating a rotary electrical machine 1G in another implementation different from those of the rotary electrical machines 1 to 1F of Embodiments 1 to 7 of the present invention.

The fixing parts 13 are connected to the housing case 14 in accordance with a method such as press-fitting. Therefore, the armature core 6 may in some instances become distorted around the fixing parts 13. However, an effect similar to those of Embodiments 1 to 7 can be achieved herein by providing the fixing parts 13 at positions included in one or more position groups from among the gcd(Q, P) position groups.

In the present Embodiments 1 to 7, instances have been illustrated in which the connection positions 11 are set to positions on the outer peripheral side of the armature core 6, but similar effects are achieved by setting the connection positions 11 to positions on the inner peripheral side of the armature core 6, or to positions on the upper and lower faces of the armature core 6.

In the present Embodiments 1 to 7, a laminated layer core resulting from stacking of thin sheets has been used as the armature core 6, but the armature core may be an integral block part; also, a metal other than iron, for instance, copper, may be used in the armature core.

In the present Embodiments 1 to 7, rotary electrical machines of inner rotor type have been illustrated in which the armature 2 is disposed on the outer peripheral side the rotor 8 is disposed on the inner peripheral side. However, the invention of the present application depends only on the number of slots Q and the number of magnetic poles P, and hence the invention can be used also in rotary electrical machines of other form, for instance of outer rotor type or of axial gap motor type.

The invention claimed is:

1. A rotary electrical machine, comprising:
    an armature having
        an armature core that has an annular core back, a plurality of magnetic pole teeth arrayed in a circumferential direction and extending inward in a radial direction from an inner peripheral surface of the annular core back, and a plurality of slots provided respectively between adjacent magnetic pole teeth in the circumferential direction, the armature core being formed by connection of a plurality of core pieces, and
        a plurality of coils disposed in respective slots of the plurality of slots based on a distributed winding or concentrated winding scheme; and
    a rotor having, on an outer peripheral surface thereof, a plurality of magnets arrayed in the circumferential direction, wherein
    where Q is a number of the plurality of slots, P is a number of the plurality of magnets, gcd(Q, P) is the greatest common divisor of Q and P, m is a number of phases, and one position group is defined as a set of m positions spaced from each other along the circumferential direction of the armature core by a pitch of an angle $$\left(\frac{360}{gcd(Q,P)\times m}\right)^\circ, \quad \text{[Math. 13]}$$

the plurality of core pieces are connected at connection positions which are set to positions respectively included in one or more of position groups, from among gcd(Q, P) position groups formed at equal pitch along the circumferential direction of the armature core.

2. The rotary electrical machine of claim 1,
wherein positions of the plurality of magnetic pole teeth or the plurality of slots constitute the connection positions.

3. The rotary electrical machine of claim 1, wherein
the plurality of coils are respectively disposed in the plurality of slots based on the distributed winding scheme; and
taking a maximum electrical angle phase difference as the largest phase difference from among phase differences between an electrical angle phase of a combined magnetomotive force which is a sum of magnetomotive forces generated by each of the plurality of coils wound around one magnetic pole tooth of the armature, and electrical angle phases of the respective magnetomotive forces,
the positions of a plurality of specific magnetic pole teeth which are the magnetic pole teeth at which the maximum electrical angle phase difference is largest, from among the plurality of magnetic pole teeth, constitute the connection positions.

4. The rotary electrical machine of claim 3,
wherein in a case where, among the plurality of the specific magnetic pole teeth, there are present adjacent specific magnetic pole teeth, positions within a range in which the adjacent specific magnetic pole teeth are present, instead of the positions of the plurality of specific magnetic pole teeth, constitute the connection positions.

5. The rotary electrical machine of claim 3, wherein
the plurality of specific magnetic pole teeth appear at every angle $$\left(\frac{360}{gcd(Q,P)\times m}\right)^\circ \quad \text{[Math. 14]}$$

along the circumferential direction of the armature core.

6. The rotary electrical machine of claim 1, wherein the armature core is formed by connection of a plurality of split cores serving as the plurality of core pieces.

* * * * *